US012771229B2

(12) United States Patent
Kasper et al.

(10) Patent No.: US 12,771,229 B2
(45) Date of Patent: Oct. 20, 2026

(54) METHOD AND CONTROL CIRCUIT FOR OPERATING A POWER CONVERTER ARRANGEMENT AND POWER CONVERTER ARRANGEMENT

(71) Applicant: Infineon Technologies Austria AG, Villach (AT)

(72) Inventors: Matthias Joachim Kasper, Villach (AT); Alex Pacini, Villach (AT)

(73) Assignee: Infineon Technologies Austria AG, Villach (AT)

( * ) Notice: Subject to any disclaimer, the term of this patent is extended or adjusted under 35 U.S.C. 154(b) by 174 days.

(21) Appl. No.: 18/918,642

(22) Filed: Oct. 17, 2024

(65) Prior Publication Data

US 2025/0158507 A1 May 15, 2025

(30) Foreign Application Priority Data

Nov. 10, 2023 (DE) ............................ 102023131314

(51) Int. Cl.
*H02M 7/483* (2007.01)
*H02M 1/00* (2006.01)
(Continued)

(52) U.S. Cl.
CPC ......... *H02M 1/007* (2021.05); *H02M 1/0025* (2021.05); *H02M 7/4833* (2021.05);
(Continued)

(58) Field of Classification Search
CPC ............... H02M 1/007; H02M 1/0025; H02M 7/4833; H02M 1/0074; H02M 1/0077; H02M 3/156; H02M 7/219; H02M 7/4837
See application file for complete search history.

(56) References Cited

U.S. PATENT DOCUMENTS

2020/0295668 A1 9/2020 Bortis et al.
2023/0074022 A1 3/2023 Zhou et al.
(Continued)

FOREIGN PATENT DOCUMENTS

DE 102019129754 A1 11/2020
DE 102020214265 A1 5/2022
DE 102021206982 A1 1/2023

OTHER PUBLICATIONS

Office Action, DE 10 2023 131 314.2, Jul. 17, 2024, pp. 1-4.

*Primary Examiner* — Crystal L Hammond
*Assistant Examiner* — Jonathan Walter Soileau
(74) *Attorney, Agent, or Firm* — Armis IP Law, LLC

(57) ABSTRACT

A method and a controller for controlling operation of a power converter is disclosed. The method includes operating a power converter in a first operating mode. The power converter includes input nodes (a, b, c), each configured to receive a respective one of input voltages (Va, Vb, Vc), intermediate nodes (x, y, z), and output nodes (p, r); a first power converter (1) coupled between the input nodes (a, b, c) and the intermediate nodes (x, y, z); and a second power converter coupled between the intermediate nodes (x, y, z) and the output nodes (p, r). Operating the power converter in the first operating mode includes adjusting an input power received by the first power converter (1); and adjusting each of a first intermediate voltage (Vx) and a second intermediate voltage (Vy) by the second power converter (2).

16 Claims, 10 Drawing Sheets

(51) Int. Cl.
*H02M 3/156* (2006.01)
*H02M 7/219* (2006.01)

(52) U.S. Cl.
CPC ........ *H02M 1/0074* (2021.05); *H02M 1/0077* (2021.05); *H02M 3/156* (2013.01); *H02M 7/219* (2013.01); *H02M 7/4837* (2021.05)

(56) References Cited

U.S. PATENT DOCUMENTS

2023/0238876 A1 7/2023 Zhang et al.
2024/0317087 A1* 9/2024 Schafmeister .......... B60L 53/14

* cited by examiner

METHOD AND CONTROL CIRCUIT FOR OPERATING A POWER CONVERTER ARRANGEMENT AND POWER CONVERTER ARRANGEMENT

RELATED APPLICATION

This application claims priority to earlier filed German Patent Application Serial Number DE 102023131314.2 entitled "METHOD AND CONTROL CIRCUIT FOR OPERATING A POWER CONVERTER ARRANGEMENT AND POWER CONVERTER ARRANGEMENT,", filed on Nov. 10, 2023, the entire teachings of which are incorporated herein by this reference.

This disclosure relates in general to a method for operating a power converter arrangement, in particular, a power converter arrangement that may be used for charging a battery, such as a battery of an electric vehicle (EV).

BRIEF DESCRIPTION

A power converter arrangement for charging a battery may include a first power converter connected to a power grid and a second power converter connected between the first power converter and the battery. The first power converter may be implemented as an AC-DC converter that generates an intermediate voltage (DC link voltage) based on alternating input voltages received from the power grid. The second power converter may be implemented as a DC-DC converter that supplies the battery based on the intermediate voltages. The second power converter usually provides galvanic isolation between the first power converter and the power grid on one side and the battery on the other side. Having this galvanic isolation, the voltage provided to the battery is referenced to a fixed potential that is separate from a ground potential to which the alternating input voltages are referenced to. In this way, a current from the battery to ground can be avoided.

The galvanic isolation may be implemented using a transformer. A transformer, however, is costly and significantly contributes to the overall size of the second power converter. It is therefore desirable to implement the second power converter without a galvanic isolation.

Furthermore, the first power converter may include several converter stages, wherein each converter stage is connected to a respective input node for receiving a respective alternating input voltage from the power grid. A power converter connected to a three-phase power grid, for example, includes three converter stages. Each converter stage usually includes at least one electronic switch that is operated in a switched-mode (pulse-width modulated (PWM) mode). In certain operating scenarios of the power converter arrangement, it is possible to operate the first power converter in a reduced switching mode, which includes to deactivate one or two of the converter stages. Deactivating converter stages reduces the power consumption required to operate the first power converter and, therefore, increases the efficiency of the power converter arrangement.

There is a need for operating a power converter arrangement with a first converter and a second converter in an efficient way, wherein the second power converter is devoid of a galvanic isolation.

One example relates to a method. The method includes operating a power converter arrangement in a first operating mode. The power converter arrangement includes input nodes, each configured to receive a respective one of input voltages, intermediate nodes, and output nodes; a first power converter coupled between the input nodes and the intermediate nodes; and a second power converter coupled between the intermediate nodes and the output nodes. Operating the power converter arrangement in the first operating mode includes adjusting an input power received by the first power converter, and adjusting each of a first intermediate voltage and a second intermediate voltage by the second power converter. Adjusting the input power received by the first power converter includes determining switched node voltage references of the first power converter, and adjusting the first intermediate voltage and the second intermediate voltage comprises includes selecting a highest switched node voltage reference from the switched node voltage references, and adjusting each of the first and second intermediate voltages to have a magnitude that is at least approximately equal to the magnitude of the highest switched node voltage reference.

Another example relates to a controller configured to operate a power converter arrangement in a first operating mode. The power converter arrangement includes input nodes, each configured to receive a respective one of input voltages, intermediate nodes, and output nodes; a first power converter coupled between the input nodes and the intermediate nodes; and a second power converter coupled between the intermediate nodes and the output nodes. To operate the power converter arrangement in the first operating mode includes to adjust an input power received by the first power converter, and to adjust each of a first intermediate voltage and a second intermediate voltage by the second power converter. To adjust the input power received by the first power converter includes determining switched node voltage references of the first power converter, and to adjust the first intermediate voltage and the second intermediate voltage includes to select a highest switched node voltage reference from the switched node voltage references, and to adjust each of the first and second intermediate voltages to have a magnitude that is at least approximately equal to the magnitude of the highest switched node voltage reference.

Examples are explained below with reference to the drawings. The drawings serve to illustrate certain principles, so that only aspects necessary for understanding these principles are illustrated. The drawings are not to scale. In the drawings the same reference characters denote like features.

DESCRIPTION OF DRAWINGS

FIG. 4 illustrates a power converter arrangement of the type illustrated in FIG. 1, wherein FIG. 4 illustrates more detailed examples of the first and second power converters that each include several converter stages;

In the following detailed description, reference is made to the accompanying drawings. The drawings form a part of the description and for the purpose of illustration show examples of how the invention may be used and implemented. It is to be understood that the features of the various embodiments described herein may be combined with each other, unless specifically noted otherwise.

DETAILED DESCRIPTION

Figure 1:
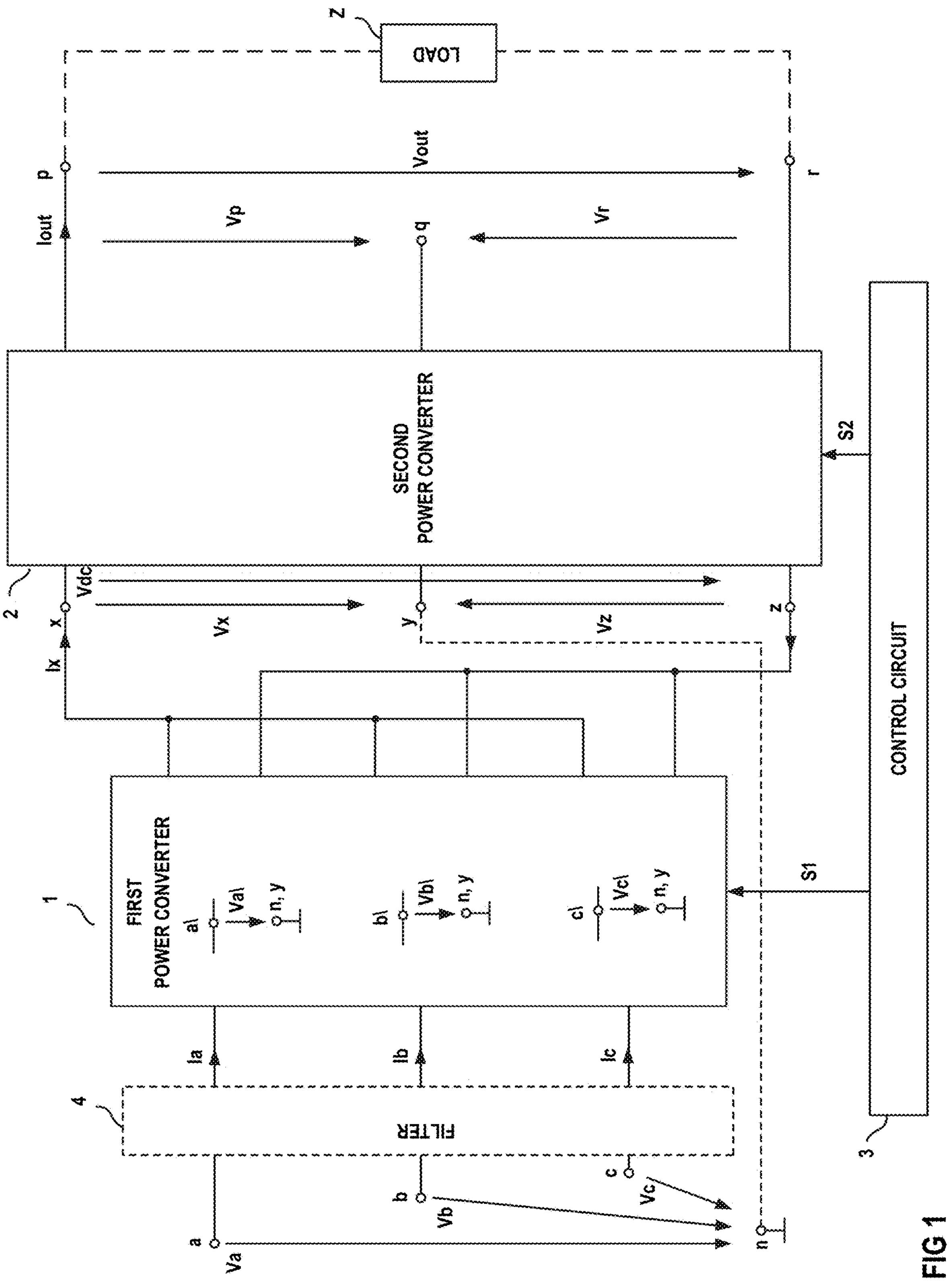
FIG. 1 illustrates one example of a power converter arrangement that includes a first power converter configured to receive input voltages, a second power converter coupled between the first power converter and an output, and a control circuit for controlling operation of the first and second power converters.

FIG. 1 illustrates one example of a power converter arrangement that includes a first power converter 1 and a second power converter 2. The power converter arrangement includes input nodes a, b, c, intermediate nodes x, y, z, and output nodes p, r. Each of the input nodes a, b, c is configured to receive a respective one of a plurality of input voltages Va, Vb, Vc. The input voltages Va, Vb, Vc are referenced to a first reference node n, which is also referred to as first ground node n in the following.

According to one example, the plurality of input nodes a, b, c includes three input nodes a, b, c, so that the power converter arrangement is configured to receive three input voltages Va, Vb, Vc. According to one example, the three input voltages Va, Vb, Vc are alternating input voltages received from a three-phase power grid, for example.

Referring to FIG. 1, the first power converter 1 is coupled between the input nodes a, b, c and the intermediate nodes x, y, z. The power converter arrangement may include three intermediate nodes x, y, z, which are referred to as first, second, and third intermediate nodes x, y, z in the following. According to one example, the first power converter 1 being coupled to the intermediate nodes includes that the first power converter 1 is coupled to only two of the three intermediate nodes x, y, z, namely the first intermediate node x and the second intermediate node z. This is explained in detail herein further below.

In operation of the power converter arrangement, two intermediate voltages Vx, Vz are available at the intermediate nodes x, y, z. The two intermediate voltages Vx, Vz include a first intermediate voltage between the first intermediate node x and the second intermediate node y, and a second intermediate voltage Vz between the second intermediate node y and the third intermediate node z. According to one example, polarities of the first and second intermediate voltages Vx, Vz are such that a magnitude of an overall intermediate voltage Vdc, which is a voltage between the first and third intermediate nodes x, z, equals the magnitude of the first intermediate voltage Vx plus the magnitude of the second intermediate voltage Vz, $|Vdc|=|Vx+|Vz|$.

In the example illustrated in FIG. 1, just for the purpose of illustration, each of the first and second intermediate voltages Vx, Vz is referenced to the second intermediate node y, which may also be referred to as second ground node. In this example, the first and second intermediate voltages Vx, Vz have opposite polarities. The first intermediate voltage Vx is a positive voltage and the second intermediate voltage Vz is a negative voltage, for example. In this example, the electrical potential at the first intermediate node x is positive relative to the electrical potential at the second intermediate node y, and the electrical potential at the third intermediate node z is negative relative to the electrical potential at the second intermediate node y. Furthermore, in this example, the overall intermediate voltage Vdc is given by the first intermediate voltage Vx minus the second intermediate voltage Vz, $Vdc=Vx-Vz$.

The second power converter 2 is connected between the intermediate nodes x, y, z and the output nodes p, r of the power converter arrangement. The output nodes p, r are configured to have a load Z (which is schematically illustrated in dashed lines in FIG. 1) connected thereto. During operation of the power converter arrangement, an output voltage Vout is available between the output nodes p, r and the power converter arrangement supplies an output current Iout at the output nodes p, r to the load Z.

The second power converter 2 is devoid of a galvanic isolation, such as a transformer, between the intermediate nodes x, y, z on one side and the output nodes p, r on the other side. This is explained in detail herein further below.

According to one example, the power converter arrangement is configured to regulate at least one of the output voltage Vout, the output current Iout, or an output power Pout. The output power Pout is given by the output voltage Vout multiplied with the output current Iout. According to one example, the load Z is a battery that is charged by the power converter arrangement. In this example, a voltage level of the output voltage Vout is defined by the battery and the output current Iout may be regulated by the power converter arrangement such that either the output current Iout is in accordance with a predefined output current reference (output current setpoint) or the output power is in accordance with a predefined output power reference.

Referring to FIG. 1, the power converter arrangement further includes a control circuit 3. The control circuit 3 is configured to control operation of the first power converter 1 and the second power converter 2. In FIG. 1, this is schematically illustrated in that the control circuit 3 provides a first control signal S1 to the first power converter 1 and a second control signal S2 to the second power converter 2. The first control signal S1 represents one or more control signals required to control operation of the first power converter 1. Equivalently, the second control signal S2 represents one or more control signals required to control operation of the second power converter number 2. More detailed examples of the first and second power converters 1, 2 and the corresponding control circuit 3 are explained herein further below.

According to one example, the first power converter 1 is a PFC (power factor correction) converter and is configured to receive alternating input voltages Va, Vb, Vc, such as power grid voltages, and control signal waveforms of input currents Ia, Ib, Ic received at the input nodes a, b, c to be in correspondence with signal waveforms of the input voltages Va, Vb, Vc. In a PFC converter, the first and second intermediate voltages Vx, Vz are DC (direct current) voltages. The first and second intermediate voltages Vx, Vz may also be referred to as first and second DC link voltages.

Figure 2:
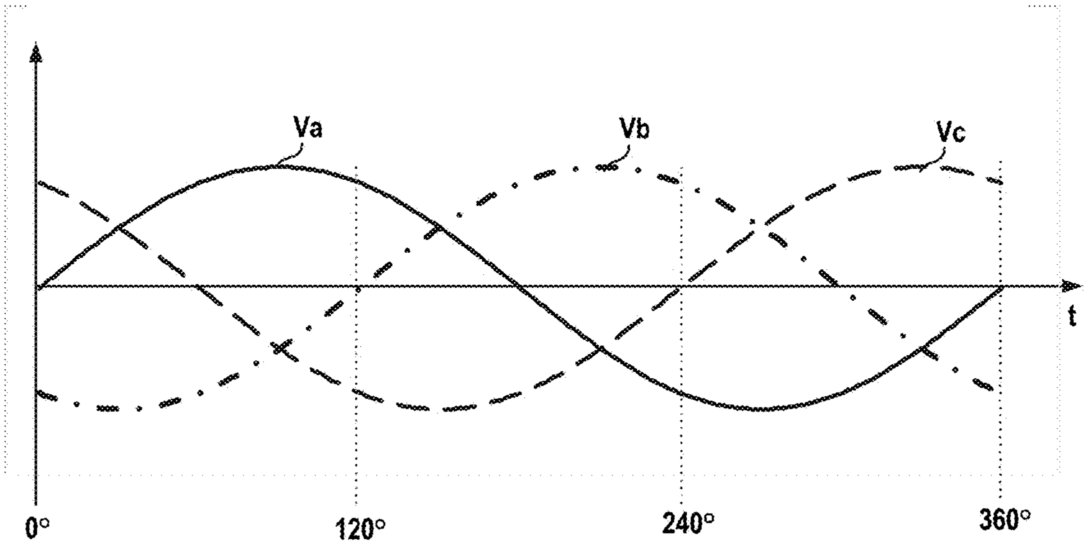
FIG. 2 illustrates signal diagrams of examples of input voltages that may be received by the first power converter.

According to one example, illustrated in FIG. 2, each of the three input voltages Va, Vb, Vc is a sinusoidal input voltage. FIG. 2 shows signal diagrams of three sinusoidal input voltages over one period of the input voltages Va, Vb, Vc. The input voltages Va, Vb, Vc are received from a three-phase power grid, for example. The input voltages Va, Vb, Vc have the same frequency and RMS (root mean-square) value. The frequency is 50 Hz or 60 Hz, and the RMS value is 230 $V_{RMS}$ or 110 $V_{RMS}$, for example. The input voltages Va, Vb, Vc are different by having different phase angles. According to one example, a phase shift between each pair of the input voltages Va, Vb, Vc is 120° (2π/3).

The load Z may be coupled to the first ground node n. Such coupling may include a capacitive coupling. Such coupling between the load Z and the first ground node n may cause a current flow between one of the output nodes p, r and the first ground node n unless measures are taken to prevent such current flow. A current flow to the first ground node n is undesirable as such current flow may cause a protection device, such as an RCD (residual current detecting) device to trip and deactivate the power converter arrangement.

One conventional way to avoid a current flow between the load Z and the first ground node n would be to provide a galvanic isolation between the input nodes a, b, c, at which the input voltages Va, Vb, Vc referenced to the first ground node n are received, and the load Z. The galvanic isolation may include a transformer. A transformer, however, is costly and significantly contributes to the overall size of the power converter arrangement.

The power converter arrangement according to FIG. 1 is therefore devoid of a galvanic isolation between the input nodes a, b, c and the output nodes p, r. In particular, the second power converter 2 is devoid of a galvanic isolation between the intermediate nodes x, y, z and the output nodes p, r.

The first power converter 1 is a switched-mode converter. This includes that the first power converter 1 includes several switches that are each configured to be operated in a switched-mode. Operating an electronic switch in a switched-mode may include operating the electronic switch in a plurality of successive drive cycles and, in each drive cycle, operating the electronic switch in an on-state (switched on-state) for an on-time and an off-state (switched off-state) for an off-time, so that the electronic switch is switched on and switched off in each drive cycle. A switching frequency fsw, which is a reciprocal of the duration Tsw of one drive cycle, is between several 10 kHz and several 100 kHz, for example. Switching on and switching off an electronic switch requires energy. Losses associated with switching on and switching off an electronic switch are usually referred to as switching losses. The switching losses of a power converter with several electronic switches increases as the number of electronic switches increases. Furthermore, the switching losses increase as the switching frequency increases. It is therefore desirable to operate the first power converter 1 with reduced switching losses.

Figure 3:
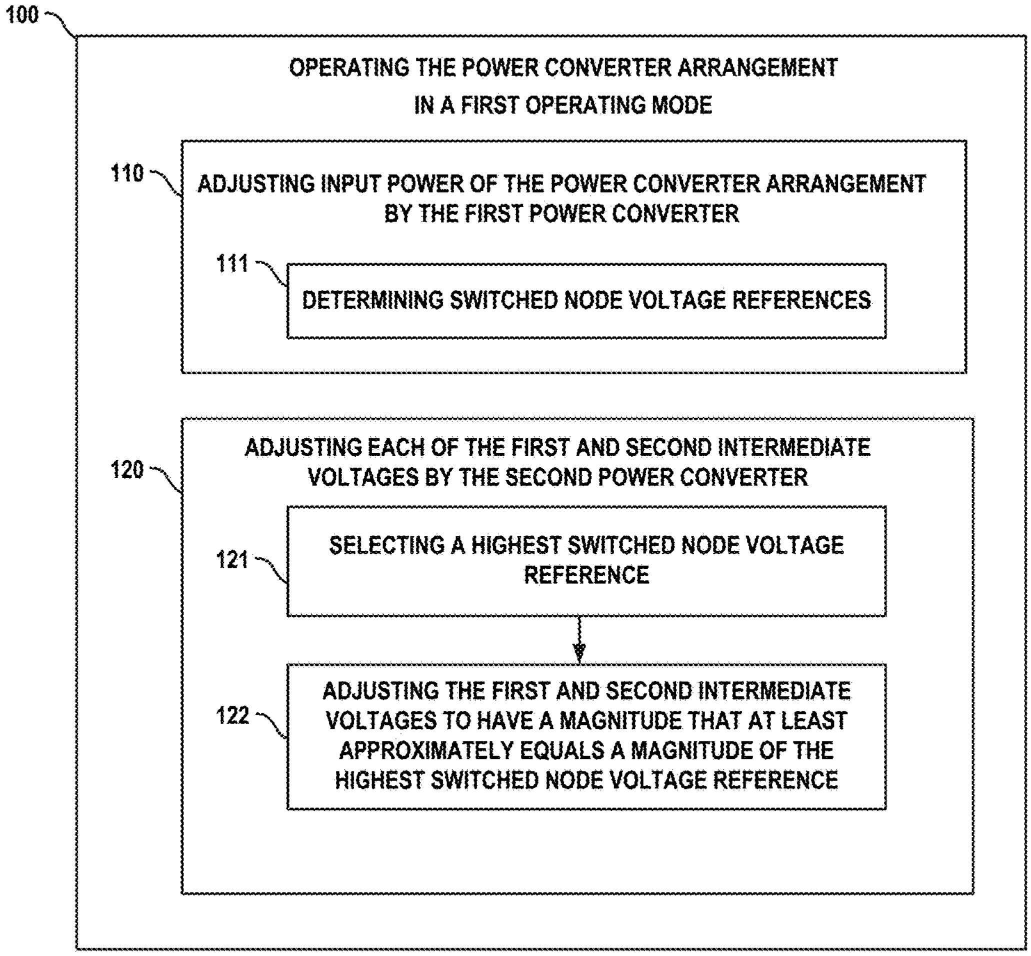
FIG. 3 illustrates one example of a method for operating a power converter arrangement of the type illustrated in FIG. 1.

FIG. 3 illustrates one example of a method for operating the power converter arrangement according to FIG. 1 in an operating mode in which that the first power converter 1 operates with reduced switching losses and in which, despite the lack of a galvanic isolation in the power converter arrangement, a current between the load Z and the first ground node n is avoided. This operating mode is referred to as first operating mode or reduced switching mode in the following.

Referring to FIG. 3, the method (100) of operating the power converter arrangement in the first operating mode includes (110) adjusting an input power of the power converter arrangement by the first power converter 1; and (120) adjusting each of the first and second intermediate voltages Vx, Vz by the second power converter 2. The input power of the power converter arrangement is power received at the input nodes a, b, c of the power converter arrangement.

Referring to FIG. 3, adjusting the input power by the first power converter includes (111) determining switched node voltage references of the first power converter 1. Adjusting each of the first and second intermediate voltages Vx, Vz by the second power converter includes (121) selecting a highest switched node voltage reference from the determined switched node voltage references of the first power converter 1; and (122) adjusting the first and second intermediate voltages Vx, Vz to have a magnitude that at least approximately equals a magnitude of the highest switched node voltage reference.

According to one example, adjusting the input power by the first power converter 1 is part of (a) regulating one of the output current Iout, the output voltage Vout, or the output current Pout and (b) regulating signal waveforms of the input currents Ia, Ib, Ic. Regulating the intermediate voltages by the second power converter 2 enables the first power converter 1 to operate in a reduced switching mode. Furthermore, regulating the first and second intermediate voltages Vx, Vz to have the same magnitude has the effect that a common mode voltage Vcm is zero.

The common mode voltage is the average of the voltage Vpn between the first output node p and the first ground node n and the voltage Vrn between the second output node r and the first ground node, $$Vcm = \frac{Vpn + Vrn}{2}. \tag{1}$$

A common mode voltage of zero has the effect that there is no or at most a negligible current between the load Z and the first ground node n, although there is no galvanic isolation between the input nodes a, b, c and the output nodes p, r.

Thus, the electrical potential at the second ground node y at least approximately equals the electrical potential at the first ground node n. This is independent of whether or not the first and second ground nodes n, y are connected. According to one example, illustrated in dashed lines in FIG. 1, the first and second ground nodes n, y are electrically connected to ensure that the second ground node y has the same electrical potential as the first ground node n even in extraordinary operating scenarios, such as startup.

Referring to the above, the first and second intermediate voltages Vx, Vy are DC voltages. That is, the first and second intermediate voltages Vx, Vz always have the same polarity, so that the overall DC link voltage Vdc always has the same polarity. The magnitude of the overall DC link voltage may slightly vary dependent on a variation of the magnitude of the first and second intermediate voltages Vx, Vy. This is explained herein further below.

The input power of the power converter arrangement is the input power Pin received by the first power converter 1 at the input nodes a, b, c. The input power received at one of the input nodes a, b, c is given by the input voltage Va, Vb, Vc multiplied with the current Ia, Ib, Ic received at the respective input node, so that an overall input power is given by $$\text{Pin} = \text{V}a \cdot Ia + \text{V}b \cdot Ib + \text{V}c \cdot Ic. \quad (2)$$

Voltage levels of the input voltages Va, Vb, Vc received at the respective input nodes a, b, c are defined by the power source, such as a power grid, providing the input voltages Va, Vb, Vc. Thus, the input power received at the input nodes a, b, c can be adjusted by adjusting the current levels of the respective input currents Ia, Ib, Ic.

Adjusting the current levels of the input currents Ia, Ib, Ic includes adjusting voltages Va\, Vb\, Vc\ at switched nodes a\, b\, c\ of the first power converter 1. The "switched nodes" are circuit nodes at which the electrical potential is switched between different levels during operation. The voltages Va\, Vb\, Vc\ at the switched nodes a\, b\, c\ are referred to as switched node voltages in the followings. The switched node voltages are referenced to the first and second ground nodes n, y. Switched node voltage references Va*, Vb*, Vc* are desired voltage levels of the switched node voltages Va\, Vb\, Vc\.

Referring to FIG. 1, the first power converter 1 includes a plurality of switched nodes a\, b\, c\, wherein each of the switched nodes a\, b\, c\ is coupled to a respective one of the input nodes a, b, c. According to one example, each of the switched nodes a\, b\, c\ is inductively coupled to the respective input node a, b, c. This is explained in detail herein further below. Furthermore, each of the switched nodes a\, b\, c\ is coupled to each of the first and third intermediate nodes x, z. This is also explained in detail herein further below.

As explained in detail herein further below, the switched node voltage Va\, Vb\, Vc\ at each switched node a\, b\, c\ can be adjusted by switching the respective switched node a\, b\, c\ between certain electric potentials, such as between electric potentials at the first and third intermediate nodes x, z. Such switching is part of the switched mode operation of the first power converter 1 and is associated with switching losses.

When adjusting the first and second intermediate voltages Vx, Vz by the second power converter 2 such that the magnitude of each of the first and second intermediate voltages Vx, Vz equals the magnitude of the highest one of the switched node voltage references Va*, Vb*, Vc* the switched node a\, b\, c\ that has the highest switched node voltage reference as its switched node voltage reference can permanently be connected to either the first intermediate node x or the third intermediate node z, so that no switching operation is required to adjust the respective switched node voltage. In this way, one of the switched node voltages a\, b\, c\ is adjusted by the second power converter 2, so that no switching operation is required to adjust the respective switched node voltage. Thus, in the power converter arrangement according to FIG. 1 in which the first power converter 1 receives three different input voltages Va, Vb, Vc and includes three switched nodes a\, b\, c\, a switched-mode operation is required to adjust only two of the three switched node voltages Va\, Vb\, Vc\. Thus, as compared to adjusting each of the three switched node voltages Va\, Vb\, Vc\ by a switched-mode operation the switching losses of the first power converter 1 are reduced. Furthermore, by adjusting each of the first and second intermediate voltages Vx, Vz to have the same magnitude as the highest switched node voltage reference, the common mode voltage is kept at zero, so that a galvanic isolation in the power converter arrangement, in particular the second power converter 2, is dispensable.

As only two of the three switched node voltages Va\, Vb\, Vc\ are adjusted by a switched-mode operation in the first operating mode explained above, the first operating mode explained above may also be referred to as ⅔ mode.

Figure 4:
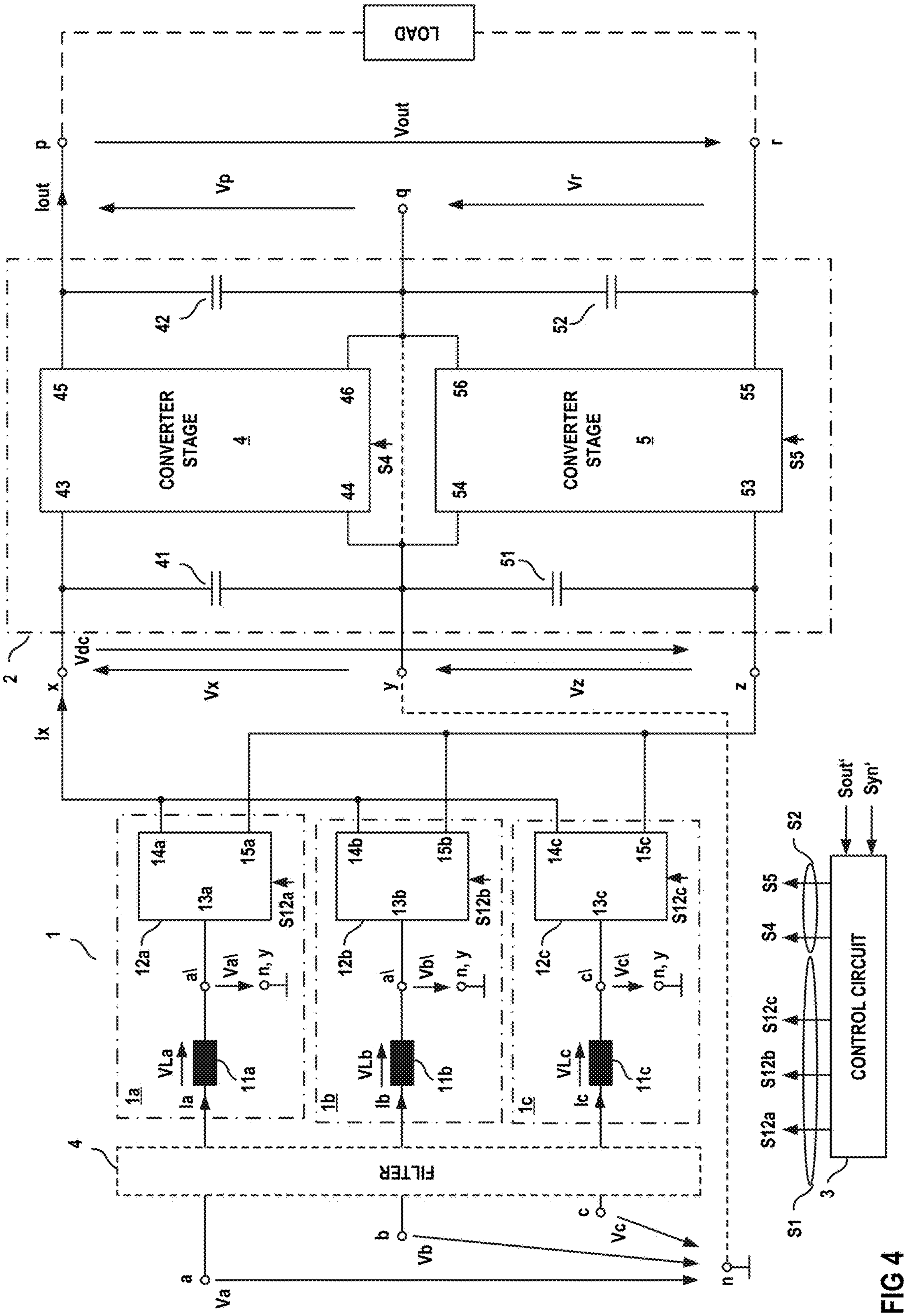

FIG. 4 illustrates examples of the first power converter 1 and the second power converter number 2 in greater detail. Referring to FIG. 4, the first power converter 1 includes a plurality of converter stages 1*a*, 1*b*, 1*c*, wherein each of the converter stages 1*a*, 1*b*, 1*c* is connected to a respective one of the input nodes a, b, c on one side and the first and third intermediate nodes x, z on the other side. Furthermore, each of the converter stages 1*a*, 1*b*, 1*c* includes a respective one of the switched nodes a\, b\, c\ explained with reference to FIG. 1.

Referring to FIG. 4, each of the converter stages 1*a*, 1*b*, 1*c* includes an inductor 11*a*, 11*b*, 11*c* that is connected between the input node a, b, c and the switched node a\, b\, c\ of the converter stage 1*a*, 1*b*, 1*c*. Furthermore, each of the converter stages 1*a*, 1*b*, 1*c* includes a switching circuit 12*a*, 12*b*, 12*c* that is connected between the switched node a\, b\, c\ on one side and the first and third intermediate nodes x, z on the other side. More specifically, each switching circuit 12*a*, 12*b*, 12*c* includes an input node 13*a*, 13*b*, 13*c* connected to the respective switched node a\, b\, c\ and the inductor 11*a*, 11*b*, 11*c*; a first output node 14*a*, 14*b*, 14*c* connected to the first intermediate node x; and a second output node 15*a*, 15*b*, 15*c* connected to the third intermediate node z.

Each of the switching circuits 12*a*, 12*b*, 12*c* is configured to receive a control signal S12*a*, S12*b*, S12*c* governing operation of the respective switching circuit 12*a*, 12*b*, 12*c* from the control circuit 3. The control signals S12*a*, S12*b*, S12*c* are part of the control signal S1 illustrated in FIG. 1 that controls operation of the first power converter 1.

Referring to FIG. 4, the second power converter 2 includes two converter stages, a first converter stage 4 and a second converter stage 5. The first converter stage 4 is connected between the first intermediate node x and the second ground node y on the one side and the first output node p and a third ground node q on the other side. More specifically, the first converter stage 4 includes a first input node 43 connected to the first intermediate node x, a second input node 44 connected to the second ground node y, a first output node 45 connected to the first output node p of the power converter arrangement, and a fourth output node 46 connected to the third ground node q.

The second converter stage 5 is connected between the second ground node y and the third intermediate node z on one side and the third ground node q and the second output node r on the other side. More specifically, the second converter stage 5 includes a first input node 53 connected to the third intermediate node z, a second input node 54 connected to the second ground node y, a first output node 55 connected to the second output node r of the power converter arrangement, and a second output node 56 connected to the third ground node q. According to one example, the second and third ground nodes y, q are connected.

Each of the first and second converter stages 4, 5 may include an input capacitor 41, 51 and an output capacitor 42, 52 (that are drawn outside the respective converter stage 4, 5 in the example illustrated in FIG. 4). The input capacitor 41, 51 is connected between the input nodes 43, 44, 53, 54 of the respective converter stage 4, 5, and the output capacitor 42, 52 is connected between the output nodes 45, 46, 55, 56 of the respective converter stage 4, 5.

In the power converter 2 according to FIG. 4, in the first operating mode of the power converter arrangement, the first converter stage 4 is configured to adjust the first intermediate voltage Vx and the second converter stage 5 is configured to adjust the second intermediate voltage Vz. Each of the converter stages 4, 5 is configured to receive a respective control signal S4, S5 from the control circuit 3. The control signals S4, S5 are part of the control signal S2 illustrated in FIG. 1 that controls operation of the second power converter 2.

Referring to FIG. 4, a first portion Vp of the output voltage Vout is available between the output nodes 45, 46 of the first converter stage 4 and a second portion Vr of the output voltage Vout is available between the output nodes 55, 56 of the second converter stage 5. Both output voltage portions Vp, Vr are referenced to the third ground node q. The output voltage Vout is given by the first output voltage portion Vp plus the second output voltage portion Vr, for example. According to one example, polarities of the first and second output voltage portions Vp, Vr are such that a magnitude of the output voltage Vout equals the magnitude of the first output voltage portion Vp plus the magnitude of the second output voltage portion Vr, $|Vout|=|Vp|+|Vr|$. According to one example, both the first output voltage portion Vp and the second output voltage portion Vr is positive, so that the output voltage Vout between the first and second output nodes p, r is positive.

In the first power converter 1 according to FIG. 4, controlling the input currents Ia, Ib, Ic of the individual converter stages 1*a*, 1*b*, 1*c* for controlling the input power Pin includes controlling voltages VLa, VLb, VLc across the inductors 11*b*, 11*b*, 11*c*. The voltage VLa, VLb, VLc across the inductor 11*a*, 11*b*, 11*c* in each of the converter stages 1*a*, 1*b*, 1*c* is given by the respective input voltage Va, Vb, Vc minus the respective switched node voltage Va\, Vb\, Vc\, $$VLa = Va - Va\backslash \tag{3a}$$

$$VLb = Vb - Vb\backslash \tag{3b}$$

$$VLc = Vc - Vc\backslash, \tag{3c}$$

so that, at a given input voltage Va, Vb, Vc, the inductor voltages VLa, VLb, VLc and, therefore, the input currents Ia, Ib, Ic and the input power Pin can be adjusted by adjusting the switched node voltages Va\, Vb\, Vc\.

Referring to FIGS. 1 and 4, an EMI filter 4 may be connected between the input nodes a, b, c and the first power converter 1. The EMI filter 4 may be implemented in a conventional way. EMI filters are commonly known, so that no further explanation is required in this regard.

Figure 5:
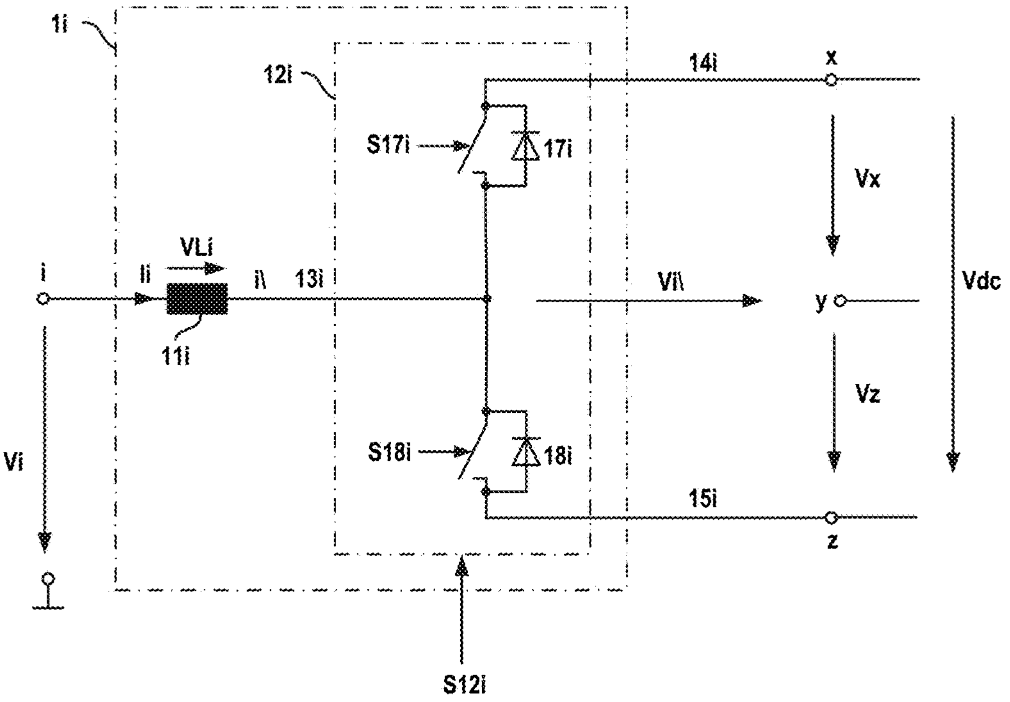
FIGS. 5 and 6 illustrate different examples of one converter stage of the first power converter.

FIG. 5 illustrates one example for implementing the switching circuit 12*b*, 12*b*, 12*c* in greater detail. More specifically, FIG. 5 illustrates one of the converter stages 1*a*, 1*b*, 1*c*. Converter stage 1*i* illustrated in FIG. 5 represents an arbitrary one of the converter stages 1*a*, 1*b*, 1*c* illustrated in FIG. 4. Furthermore, in FIG. 5, i denotes the input node of the respective converter stage 1*i*; Vi denotes the input voltage; Ii denotes the input current; i\ denotes the switched node; Vi\ denotes the switched node voltage; 11*i* denotes the inductor connected between the input i and the switched node i\; VLi denotes the voltage across the inductor 11*i*; 12*i* denotes the switching circuit; 13*i* denotes the input of the switching circuit 12*i*; and 14*i*, 15*i* denote the output nodes of the switching circuit 12*i*. Each of the converter stages 1*a*, 1*b*, 1*c* may be implemented in accordance with the converter stage 1*i* illustrated in FIG. 5.

Referring to FIG. 5, the switching circuit 12*i* includes a first electronic switch 17*i* connected between the switched node i\ and the first output node 14*i*, which is the output node connected to the first intermediate node x. A second electronic switch 18*i* is connected between the switched node i\ and the second output node 15*i*, which is the output node connected to the third intermediate node z.

The switching circuit 12*i* illustrated in FIG. 5 is a two-level circuit that is configured to apply one of two different voltage levels to the switched node i\, a first voltage level that equals the (positive) first intermediate voltage Vx, and a second voltage level that equals the (negative) second intermediate voltage Vz. In the following, an operating state in which the switching circuit 1*i* applies the first voltage level to the switched node i\ is referred to as first switching state ST1, and an operating state in which the switching circuit 1*i* applies the second voltage level to the switched node i\ is referred to as second switching state ST2.

According to one example, the switching circuit 1*i* operates in a plurality of successive drive cycles such that in each drive cycle the switching circuit 1*i* operates in the first switching state ST1 for a first time period Tst1 and in the second switching state for a second time period Tst2. In this example, the average of the switched node voltage Vi\ is given by $$Vi\backslash = \frac{Vx \cdot Ts1 + Vz \cdot Ts2}{Tsw}, \tag{4}$$

where Tst1 denotes the first time period, Tst2 denotes the second time period, Vx denotes the first intermediate voltage, Vz denotes the second intermediate voltage, and Tsw denotes the duration of the drive cycle, and where $Tst1 \geq 0$ and $Tst2 \geq 0$.

According to one example, the drive cycles have the same duration, so that the switching circuit 12*i* is operated at a switching fixed frequency fsw. The switching frequency is much higher than the frequency of the input voltages Va, Vb, Vc and, as outlined above, is between 10 kHz and several 100 kHz, for example.

As can be seen from equation (1) the switched node voltage Vi\ can be adjusted by suitably adjusting the first and second time periods Tst1, Tst2 in consideration of the voltage levels of the first and second intermediate voltages Vx, Vz.

The switching circuit 12*i* according to FIG. 5 is in the first operating state ST1 when the first electronic switch 17*i* is in an on-state (switched-on state) and the second electronic switch 18*i* is in an off-state (switch-off state). Furthermore, the switching circuit 12*i* is in the second operating state ST2 when the second electronic switch 18*i* is the on-state and the first electronic switch 18*i* is in the off-state (switched-off state).

To operate the switching circuit 12*i* either in the first state ST1 or the second state ST2, the first and second electronic switches 17*i*, 18*i* are operated in a complementary fashion. The latter includes that only one of the first and second electronic switches 17*i*, 18*i* is in an on-state (switched-on state) on at the same time. In order to avoid a cross current between the first and third intermediate nodes x, z there may be a dead time between switching off one of the first and second electronic switches 17$i$, 18$i$ and switching on the other one of the two electronic switches 17$i$, 18$i$.

Referring to FIG. 5, each of the electronic switches 17$i$, 18$i$ may include a switching element and a rectifier element, such as a diode connected in parallel with the switching element. Switching on and off each of the electronic switches 17$i$, 18$i$ includes switching on and off the respective switching element. During the dead time, the rectifier element of one of the first and second switches 17$i$, 18$i$ takes over the current Ii through the inductor 11$i$. Which of the rectifier elements takes over the current Ii depends on the current direction. The rectifier element of the first switch 17$i$ takes over the inductor current Ii when the current flows in the direction indicated by the arrow in FIG. 5, and the rectifier element of the second switch 18$i$ takes over the inductor current Ii when the current flows in the direction opposite the direction indicated by the arrow in FIG. 5.

The switching element and the rectifier element may be discrete elements that are connected in parallel to form the respective electronic switch 17$i$, 18$i$. According to one example, the switching element and the rectifier element are formed by the same switching device. According to one example, the switching device is a transistor device. According to one example, the transistor device is a MOSFET. In this example, the rectifier element is formed by the body diode of the MOSFET and is an integral part of the MOSFET. The MOSFET is an N-type enhancement MOSFET, for example.

The transistor device, however, is not restricted to be implemented as a MOSFET. Any other type of transistor device, such as an IGBT, a JFET, or a GaN-HEMT, each with an integrated or a discrete rectifier element, may be used as well.

Referring to the above, the switching circuit, to adjust the switched node voltage Vi\ and the input current Ii, alternatingly operates in the first switching state ST1 and the second switching state ST2. In one of the switching states ST1, ST2 the inductor 11$i$ is magnetized, so that energy is stored in the inductor 11$i$, and in the other one of the switching states ST1, ST2 the inductor 11$i$ is demagnetized, so that the inductor 11$i$ transfers energy to the intermediate nodes x, z. In which of the switching states ST1 the inductor is magnetized and in which of the switching states ST2 the inductor is demagnetized is dependent on the polarity of the input voltage Vi and, therefore, the direction of the inductor current Ii. For example, if the input voltage Vi is positive and the inductor current Ii flows in the direction indicated by the arrow in FIG. 5, the inductor 11$i$ is magnetized when the switching circuit 12$i$ is in the second operating state ST2. In this example, the switched node i\ receives the second intermediate voltage Vz and is demagnetized when the switching circuit 12$i$ is in the first operating state ST1. If the input voltage Vi is negative and the inductor current Ii flows in the direction opposite the direction indicated by the arrow in FIG. 5, the inductor 11$i$ is magnetized when the switching circuits 12$i$ is in the first operating state ST1. In this example, the switched node i\ receives the first intermediate voltage Vx and is demagnetized when the switching circuit 12$i$ is in the second operating state ST2.

In each drive cycle, the magnitude of the input current Ii increases when the inductor 11$i$ is magnetized and decreases when the inductor 11$i$ is demagnetized. It should be noted that "input current Ii" as used herein denotes the average of the input current over the duration of at least one drive cycle of the switching circuit 12$i$. Equivalently, "switched node voltage Vi\" as used herein, and in accordance with equation (2), denotes the average of switched node voltage over the duration of at least one drive cycle of the switching circuit 12$i$.

Figure 6:
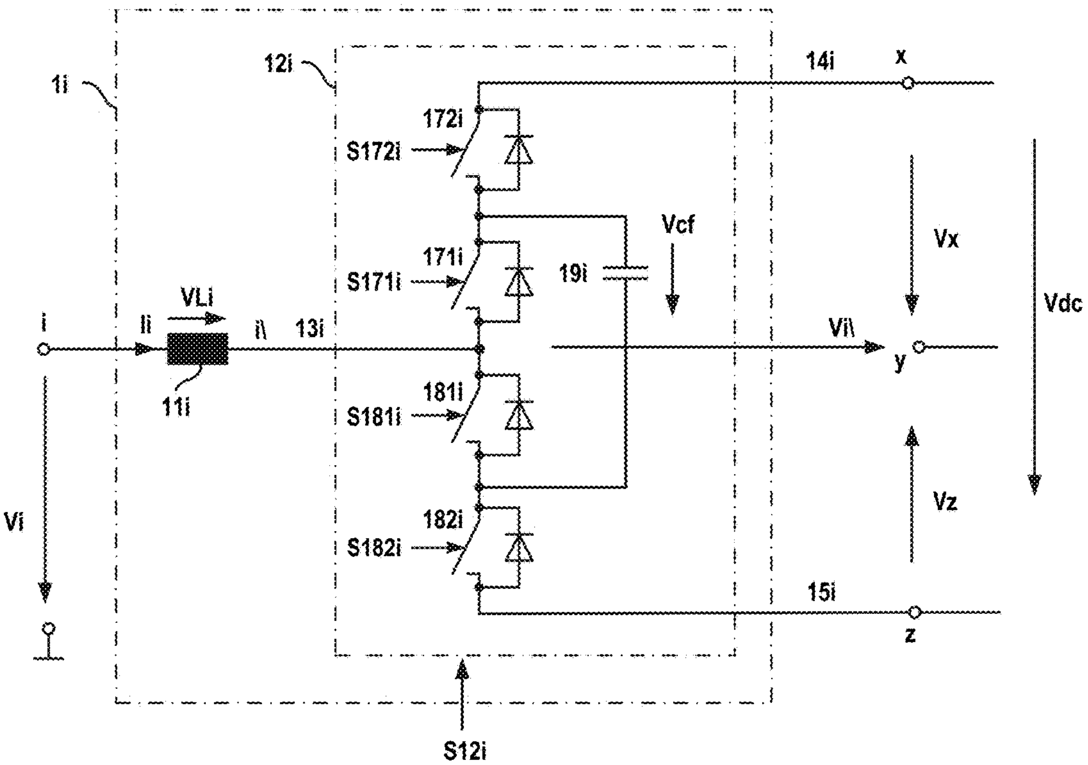

Implementing the switching circuit 1$i$ as illustrated in FIG. 5 with a first electronic switch 17$i$ connected between the switched node i\ and the first intermediate node x and a second electronic switch 18$i$ connected between the switched node i\ and the second intermediate node z is only an example. Various other kinds of switching circuits that are configured to adjust the switched node voltage i\ by switching the electrical potential (voltage) at the switched node between two or more different voltages may be used as well. One further example of a switching circuit 1$i$ is illustrated in FIG. 6. The switching circuit 1$i$ illustrated in FIG. 6 is a three-level switching circuit. That is, the switching circuit 1$i$ is configured to switch the electrical potential at the switched node i\ between three different electrical potentials in order to adjust the (average) switched node voltage Vi\ over one drive cycle.

Referring to FIG. 6, the switching circuit 1$i$ according to FIG. 6 includes four electronic switches 171$i$, 172$i$, 181$i$, 182$i$. Each of the electronic switches 171$i$, 172$i$, 181$i$, 182$i$ may include a switching element and a rectifier element and may be implemented in accordance with any of the examples explained with reference to the electronic switches 17$i$, 18$i$ illustrated in FIG. 5. Each of the switches 171$i$, 172$i$, 181$i$, 182$i$ switches on or off dependent on a respective drive signal S171$i$, S172$i$, S181$i$, S182$i$ received from the control circuit 3. The drive signals S171$i$, S172$i$, S181$i$, S182$i$ for switching on and off the electronic switches 171$i$, 172$i$, 181$i$, 182$i$ are part of the control signal S12$i$ illustrated in FIG. 6.

Referring to FIG. 6, the switching circuit 1$i$ includes a first electronic switch 171$i$ and a second electronic switch 172$i$ connected in series between the switched node i\ and the first intermediate node x and a third electronic switch 181$i$ and a fourth electronic switch 182$i$ connected in series between the switched node i\ and the third intermediate node z. The first electronic switch 171$i$ is connected to the switched node i\, and the second electronic switch 182$i$ is connected between the first electronic switch 171$i$ and the first intermediate node x. The third electronic switch 181$i$ is connected to the switched node i\, and the fourth electronic switch 182$i$ is connected between the third electronic switch 181$i$ and the third intermediate node z. Furthermore, the switching circuit 1$i$ includes a flying capacitor 19$i$ that is connected between a circuit node connecting the first and second electronic switches 171$i$, 172$i$ and a circuit node connecting the third and fourth electronic switches 181$i$, 182$i$.

The switching circuit 1$i$ according to FIG. 6 is configured to switch the electrical potential at the switched node i\ between four different levels in four different switching states, (i) a first level corresponding to the electrical potential at the first intermediate node x in a first switching state S11; (ii) a second level corresponding to the electrical potential at the third intermediate node z in a second switching state ST12; (iii) a third level corresponding to the electrical potential at the first intermediate node x minus a voltage Vcf across the flying capacitor 19$i$ in a third switching state ST13; and (iv) a fourth level corresponding to the electrical potential at the third intermediate node z plus the voltage Vcf across the flying capacitor 19$i$ in a fourth switching state ST14.

In each drive cycle, the (average) switched node voltage Vi\ is therefore given by $$Vi\backslash = \frac{Vx \cdot Tst11 + Vz \cdot Tst12 + (Vx - Vcf) \cdot Tst13 + (Vz - Vcf) \cdot Tst14}{Tsw}, \quad (5)$$

where, in each drive cycle, Tst11 denotes the time period the switching circuit 1*i* is in the first state ST11, Tst12 denotes the time period the switching circuit 1*i* is in the second state ST12, Tst13 denotes the time period the switching circuit 1*i* is in the third state, and Tst14 denotes the time period the switching circuit 1*i* is in the fourth state ST14. It should be noted that the switching circuit 1*i*, not necessarily, is operated in each of the four switching states in each drive cycle in order to adjust the switched node voltage Vi\. Thus, two or more of the first, second, third, and fourth time periods Tst11, Tst12, Tst13, Tst14 may be zero in one drive cycle.

During the switched mode operation of the switching circuit 1*i*, the voltage Vcf across the flying capacitor 19*i* can be balanced to be essentially equal to 50% of the overall intermediate voltage Vdc. In this case, as the first and second intermediate voltages Vx, Vz are essentially equal, the voltage Vx-Vcf in the third state ST13 essentially equals the voltage Vcf-Vz in the fourth state ST14, so that the third and fourth states ST13, ST14 are redundant. The magnitudes of the first and second intermediate voltages Vx, Vz are equal and equal to 50% of the overall intermediate voltage Vdc, so that each of voltages Vx-Vcf in the third state ST13 and Vcf-Vz in the fourth state ST14 is essentially zero, Vx-Vcf=Vcf-Vz=0. One example for balancing the voltage Vcf about the flying capacitor 19*i* to be essentially equal to 50% of the overall intermediate voltage Vdc is explained herein further below.

In the different switching states, the electronic switches 171*i*, 172*i*, 181*i*, 182*i*, are operated as explained in the following. (i) In the first switching state ST11, the first and second electronic switches 171*i*, 172*i* are operated in the on-state and the third and fourth electronic switches 181*i*, 182*i* are operated in the off-state; (ii) in the second switching state ST12, the third and fourth electronic switches 181*i*, 182*i* are operated in the on-state and the first and second electronic switches 171*i*, 172*i* are operated in the off-state; (iii) in the third switching state ST13, the second and third electronic switches 172*i*, 181*i* are operated in the on-state and the first and third electronic switches 171*i*, 182*i* are operated in the off-state; and (iv) in the fourth switching state S1 the first and fourth electronic switches 171*i*, 182*i* are operated in the on-state and the second and third electronic switches 172*i*, 181*i* are operated in the off-state. As explained with reference to equation (5), the switched node voltage Vi\ can be adjusted dependent on the first and second intermediate voltages Vx, Vz and the flying capacitor voltage Vcf (that adjusts dependent on the first and second intermediate voltages Vx, Vz) by suitably adjusting time durations of operating the switching circuit 1*i* in the first, second, third, and fourth operating states ST11, ST12, ST13, ST14.

Figure 7:
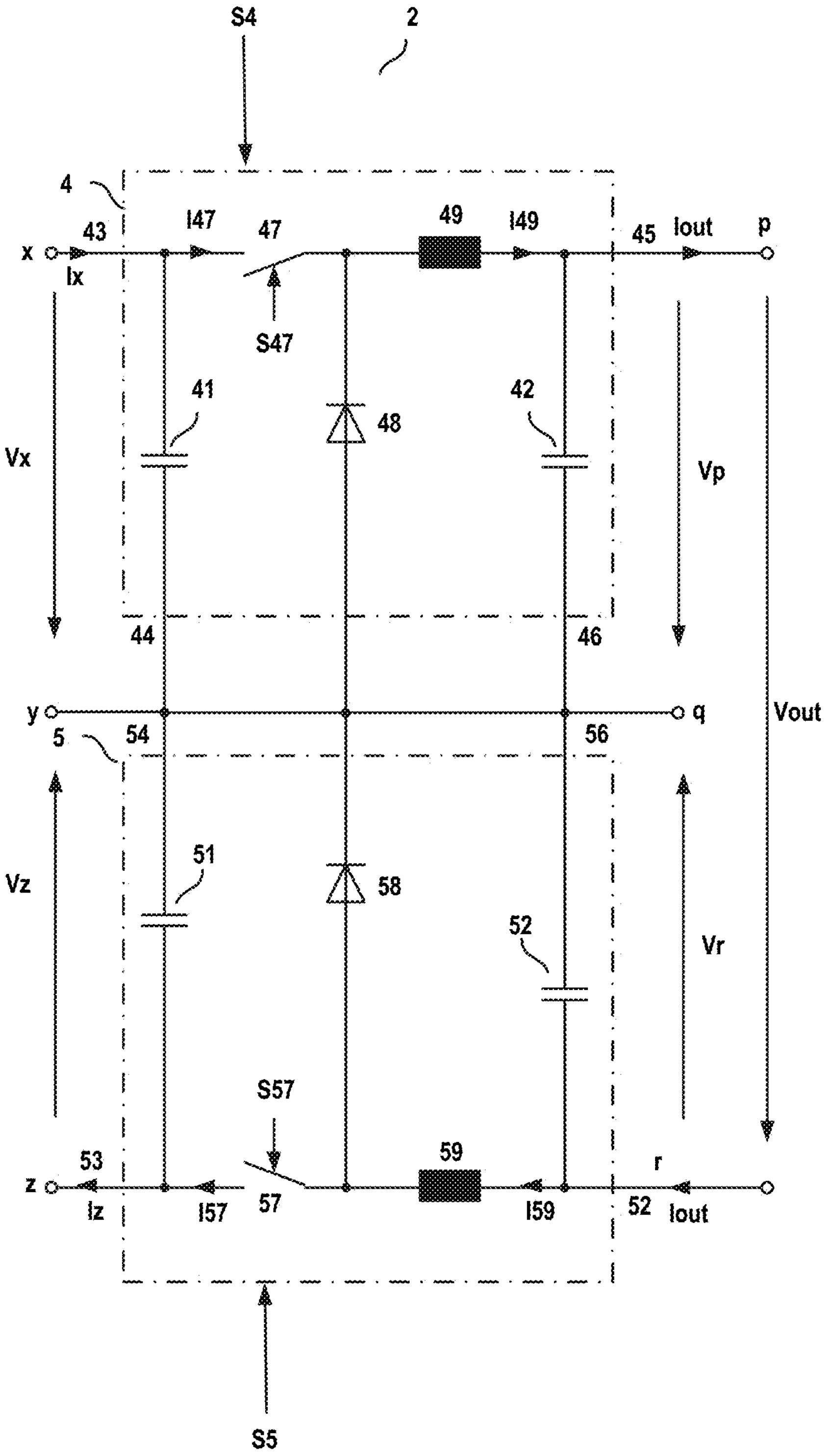

FIG. 7 illustrates examples for implementing the first and second converter stages 4, 5 of the second power converter 2. In the example illustrated in FIG. 7, each of the first and second converter stages 4, 5 is implemented as a buck converter that includes an electronic switch 47, 57, an inductor 49, 59, and a rectifier element (freewheeling element) 48, 58. The rectifier elements 48, 58 can be implemented as passive rectifier elements, such as diodes (as illustrated), or as active rectifier elements (synchronous rectifiers).

In the first converter stage 4, the electronic switch 47 and the inductor 49 are connected in series between the first input node 43 and the first output node 45, the rectifier element 48 is connected in parallel with a series circuit including the inductor 49 and the output capacitor 42. Furthermore, the second input node 44 and the second output node 46 are connected. In the second converter stage 5, the electronic switch 57 and the inductor 59 are connected in series between the first input node 53 and the first output node 55, the rectifier element 58 is connected in parallel with a series circuit including the inductor 59 and the output capacitor 52. Furthermore, the second input node 54 and the second output node 56 are connected.

The electronic switch 47, 57 in each of the converter stages 4, 5 can be operated in a switched mode, so that each of the switches 47, 57 alternatingly switches on and switches off. The converter stages 4, 5 may be operated with a fixed switching frequency, so that each drive cycle of operating the electronic switches 47, 57 has the same duration. The switching frequency of operating the first and second converter stages 4, 5 of the second power converter 2 can be in the same range as the switching frequency of the converter stages 1*a*, 1*b*, 1*c* of the first power converter 1.

In the first converter stage 4, when the electronic switch 47 is in the on-state, the output current Iout flows through the electronic switch 47 and the inductor 49. When the electronic switch 47 switches off, the freewheeling element 48 takes over the output current Iout from the electronic switch 47. In the second converter stage 5, when the electronic switch 57 is in the on-state, the output current Iout flows through the electronic switch 57 and the inductor 59. When the electronic switch 57 switches off, the freewheeling element 58 takes over the current from the electronic switch 57.

Referring to FIG. 7, the electronic switches 47, 57 in the first and second converter stages 4, 5 are controlled by control signals S47, S57. According to one example, these control signals (drive signals) S47, S57 correspond to the respective control signals S4, S5 received by the first and second converter stages 4, 5.

Referring to the above, in the first operating mode of the power converter arrangement, the first converter stage 4 of the second power converter 2 adjusts the voltage level of the first intermediate voltage Vx. The magnitude of first intermediate voltage Vx increases, for example, when a duty cycle of operating the switch 47 in the first converter stage 4 is such that an (average) first intermediate current Ix is higher than an (average) switch current I47. In this case, the input capacitor 41 is charged so that the first intermediate voltage Vx increases. The "average first intermediate current" is the average of the first intermediate current Ix over one or more drive cycles of the switched-mode operation of the electronic switch 47. The average switch current I47 is the average of the current through the switch 47 over one or more drive cycles of the switched-mode operation of the electronic switch 47. The first intermediate current Ix is the current received at the first intermediate node x. Equivalently, the first intermediate voltage Vx decreases, when the (average) first intermediate current Ix is lower than the average switch current I47.

The "duty cycle" of operating the switch 47, for example, is the ratio between the on-time duration and the duration of one drive cycle in the switched-mode operation of the electronic switch 47. Basically, the higher the duty cycle, the longer the switched 47 is switched on during the drive cycle. This definition of "duty cycle" is commonly known, so that no further explanation is required in this regard.

The magnitude of the second intermediate voltage Vz increases, for example, when a duty cycle of the switched-mode operation of the electronic switch 57 in the second converter stage 5 is such that a magnitude of an average second intermediate current Iz is higher than a magnitude of an average switch current I57. The "average second intermediate current Iz" is the average of the second intermediate current Iz over one or more drive cycles of the switched mode operation of the electronic switch 57, and the average switch current I57 is the average of the current through the switch 57 over one or more drive cycles of the switched-mode operation of the electronic switch 57. The second intermediate current Iz is the (negative) current received at the second intermediate node z. Equivalently, the magnitude of the second intermediate voltage Vz decreases, when the magnitude of the average second intermediate current Iz is lower than the average switch current I57. In the following, unless stated otherwise, the second intermediate current Iz is the average (over the duration of at least one drive cycle) of the second intermediate current Iz, and the average switch current I47 is the average (over the duration of at least one drive cycle) of the switch current I47.

Figure 8:
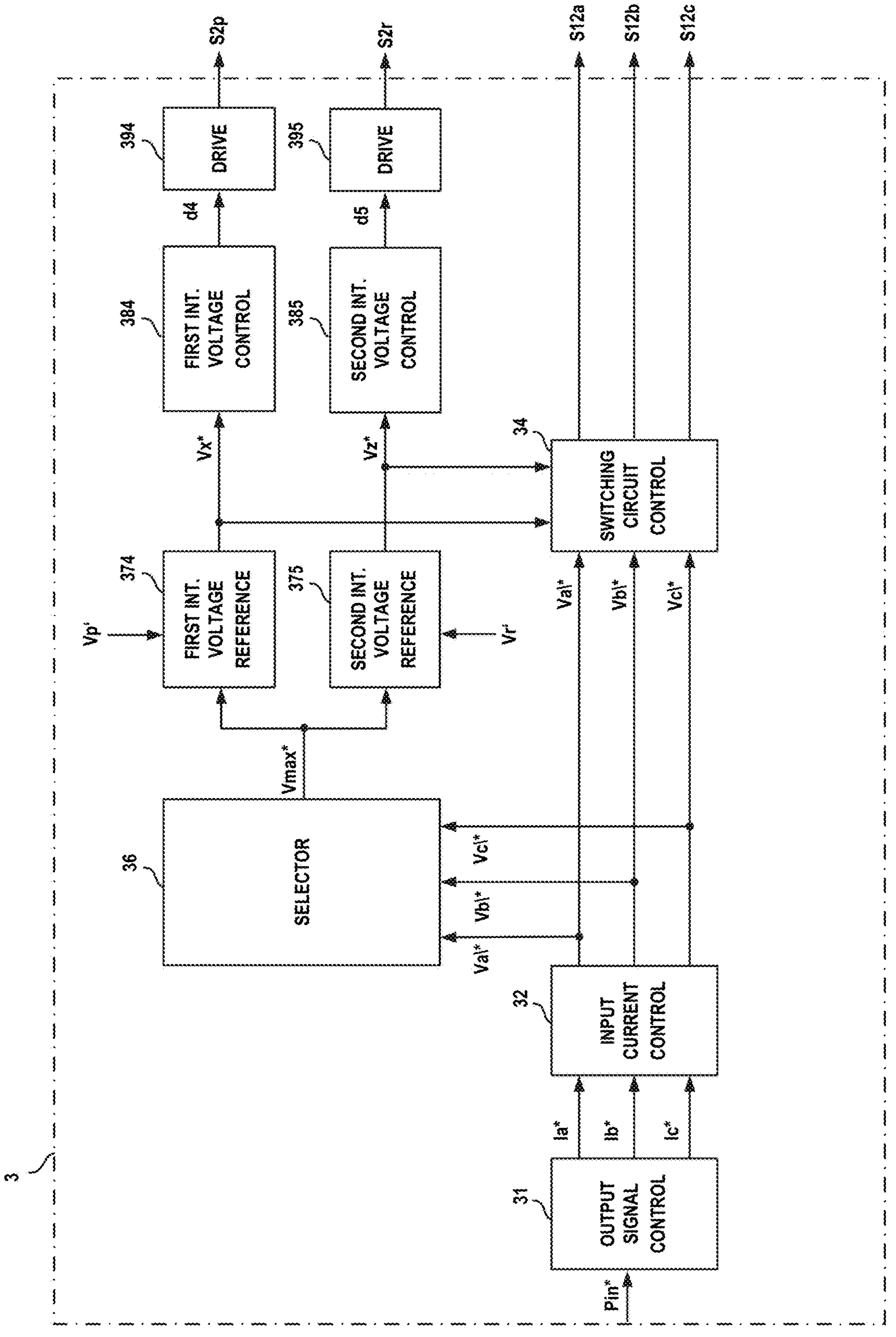
FIG. 8 illustrates a block diagram of the control circuit according to one example.

FIG. 8 illustrates a block diagram of the control circuit 3 according to one example. It should be noted that FIG. 8 illustrates the functionality of the control circuit 3 rather than a specific implementation. The control circuit 3 may be implemented in various ways. According to one example, the control circuit 3, which may include several control units, can be implemented as a dedicated control circuit. According to another example, the control circuit 3 includes a microcontroller, wherein the different control units may be implemented as different program codes each configured to operate the microcontroller such that it has the functionality of the respective control unit.

Referring to FIG. 8, one of the control units of the control circuit number 3 is an output signal controller 31. The output signal controller 31 is configured to receive an input power reference Pin* and provide input current references Ia*, Ib*, Ic*. Each of the input current references Ia*, Ib*, Ic* represents a desired current level of an average of a respective one of the input currents Ia, Ib, Ic. As detailed before, the average of an input current Ia, Ib, Ic is the average of the current over one or more drive cycles of the switched mode operation of the converter stage 1*a*, 1*b*, 1*c* receiving the respective input current Ia, Ib, Ic. The input power reference Pin* represents a desired (instantaneous) input power of the power converter arrangement. "Instantaneous input power" in this context includes the input power over one or more drive cycles of the switched mode operation of the converter stage is 1*a*, 1*b*, 1*c*. The input power reference Pin* may be obtained in different ways. Examples are explained herein further below.

Referring to FIG. 8, an input current controller 32 receives the input current references Ia*, Ib*, Ic* and is configured to output the switched node voltage references Va*, Vb*, Vc* for controlling the input currents Ia, Ib, Ic dependent on the input current references Ia*, Ib*, Ic*.

A controller 34 receives the switched node voltage references Va*, Vb*, Vc* from the input current controller 32, a first intermediate voltage reference Vx* from a first intermediate voltage reference controller 374, and a second intermediate voltage reference Vz* from a second intermediate voltage reference controller 375. The first intermediate voltage reference Vx* represents the desired voltage level of the first intermediate voltage Vx, and the second intermediate voltage reference Vz* represents the desired voltage level of the second intermediate voltage reference Vz.

The controller 34 is configured to adjust and output the control signals S12*a*, S12*b*, S12*c* received by the switching stages 1*a*, 1*b*, 1*c* dependent on the switched node voltage references Va*, Vb*, Vc* and the first and second intermediate voltage references Vx*, Vz*. More specifically, in each drive cycle, the controller 34 adjusts the time durations of the individual switching states of the respective switching circuits 1*a*, 1*b*, 1*c* dependent on the switched node voltage references Va*, Vb*, Vc* and the intermediate voltage references Vx*, Vz*. If, for example, the switching circuits 1*a*, 1*b*, 1*c* are in accordance with the example illustrated in FIG. 5 and Vi* is the switched node voltage of one of the switching circuits 1*a*, 1*b*, 1*c*, the controller 34 may calculate the time durations Tst1, Tst2 for which the respective switching circuit 1*i* is in the first or second switching state S1, ST2, considering equation (4), such that the switched node voltage reference Vi*, first and second measured intermediate voltages Vx', Vz' and the first and second time period Tst1, Tst2 are in accordance with $$Vi\backslash^{*} = \frac{Tst1 \cdot Vx' + Tst2 \cdot Vz'}{Tsw}. \tag{6}$$

The measured first and second measured intermediate voltages Vx', Vz' are obtained by measuring the first and second intermediate voltages Vx, Vz using a voltage measurement circuit and, optionally, low-pass filtering the respective measurement result.

Given that Tst2=Tsw-Tst1, the first time duration Tst1 is $$Tst1 = \frac{Vi\backslash^{*} - Vz'}{Vx' - Vz'} \cdot Tsw, \tag{7a}$$

and the second time duration Tst2 is $$Tst2 = Tsw - Tst1 = \frac{Vx' - Vi\backslash^{*}}{Vx' - Vz'}. \tag{7b}$$

Equivalently, duty cycles dst1, dst2 of operating the respective switching stage 1*i* in the first and second operating modes are given by, $$dst1 = \frac{Tst1}{T}, \tag{8a}$$

$$dst2 = \frac{Tst2}{T} = 1 - dst1. \tag{8b}$$

If, for example, the switched node voltage reference is zero, Vi*=0, the duty cycles of operating the switching stage 1*i* in the first and second operating states ST1, ST2 is dst1=dst2=0.5 (the first and second intermediate voltage references Vx*, Vz* are equal). If, for example, the switched node voltage reference equals the (positive) first intermediate voltage reference, Vi*=Vx*, the first duty cycle equals one, dst1=1, and the second duty cycle equals zero, dst2=0. If, for example, the switched node voltage reference equals the (negative) second switched node voltage reference, Vi*=Vz*, the first duty cycle equals zero, dst1=0, and the second duty cycle equals one, dst2=1.

According to one example, the switching circuit controller 34 calculates the time periods of the first and second switching states ST1, ST2 dependent on equations (7a) and (7b) or equations (8a) and (8b) and drives the switching stages 1*a*, 1*b*, 1*c* accordingly.

Equivalently, when the switching stages 1*a*, 1*b*, 1*c* are in accordance with the example illustrated in FIG. 6, for example, the switching circuit controller 34 calculates, considering equation (5), the time periods Tst11, Tst12, Tst13, Tst14 for which, in each drive cycle, the respective switching stage 1*a*, 1*b*, 1*c* is in the respective switching state such that the switched node voltage reference Vi*, the first and second measured intermediate voltages Vx', Vz' and the first to fourth time periods Tst11-Tst14 are in accordance with $$\mathrm{V}i\backslash^{*} = \frac{Tst11 \cdot \mathrm{V}x' + Tst12 \cdot 0 + Tst13 \cdot \mathrm{V}z' + Tst14 \cdot 0}{T}. \tag{9}$$

If, for example, the switched node voltage reference is greater than zero, Vi*>0, the switching circuit controller 34 may only switch between the first operating state ST11 and one of the redundant second and fourth operating states TS12, TS14, so that the first, second, and fourth time periods Tst11, Tst12, Tst14 are in accordance with $$\mathrm{V}i\backslash^{*} = \frac{Tst11 \cdot \mathrm{V}x' + Tst12 \cdot 0 + Tst14 \cdot 0}{Tsw} \tag{10a}$$

and the third time period Ts13 is zero, $$Tst13 = 0. \tag{11a}$$

so that $$Tst11 = \frac{\mathrm{V}i\backslash^{*}}{\mathrm{V}x'} \cdot Tsw. \tag{12a}$$

According to one example, the switching circuit controller 34, in each drive cycle, operates the switching circuit 1*i* in the first state ST11 for the time period Tst11 and in only one of the redundant second and fourth states for the respective time period Tst12=Tsw-Tst11 and Tst14=Tsw-Tst11, wherein the switching controller 34 alternates between the second and fourth states Tst12, Tst14. Thus, for adjusting a switched node voltage reference greater than zero, the order in which the switching circuit 1*i* assumes different switching states is, for example, ST11-ST12-ST11-ST14-ST11-ST12 ST11-ST14 . . . .

In one of the second and fourth states ST12, ST14 the flying capacitor 19*i* is charged so that the voltage Vcf increases and in the other one of the second and fourth states ST12, ST14 the flying capacitor 19*i* is discharged so that the voltage Vcf decreases. If the input current Ii flows in the direction as indicated in FIG. 6, for example, the capacitor 19*i* is charged in the second state ST12 (when switches 172*i* and 181*i* are on) and discharged in the fourth state ST14 (when switches 171*i* and 182*i* are on).

The voltage Vcf across the flying capacitor 19*i* can be balanced (adjusted) by varying the time durations in which the switching circuit 1*i* is in the second and fourth operating states ST12, ST14. To increase the voltage Vcf across the flying capacitor 19, for example, the switching circuit controller 34 may increase the duration Tst12 of the second operating state ST12 for a predefined time duration ΔT at the expense of the duration Tst11 of the first operating state ST11 in a first drive cycle and may decrease the duration Tst14 of the fourth operating state ST14 for the predefined ΔT time duration in favor of the duration Tst11 of the first operating state ST11 in a second drive cycle.

Thus, in the first drive cycle, the switching circuit 1*i* is operated in the first operating state ST11 for a time duration that is given by Tst11-ΔT and is operated in the second operating state ST12 for a time duration that is given by Tsw-Tst11+ΔT, where Tst11 is calculated in accordance with equation (11a). In the second drive cycle, the switching circuit 1*i* is operated in the first operating state ST11 for a time duration that is given by Tst11+ΔT and is operated in the fourth operating state ST14 for a time duration that is given by Tsw-Tst11+ΔT.

In this way, the average of the time duration in which the switching circuit 1*i* is in the first operating state ST11 equals Tst11 as defined by equation (11a), and the average of the time duration in which the switching circuit 1*i* is in one of the redundant second and fourth operating states ST12, ST14 equals Tsw-Tst11, so that balancing the voltage Vcf across the capacitor 19*i* does not negatively affect adjusting the switched node voltage Vi\. At the same time, the duration of the second operating state ST12 can be made longer than the duration of the fourth operating state ST14 in order to increase the voltage Vcf across the flying capacitor 19*i* (when the current Ii flows in the direction is indicated in FIG. 6) or can be made shorter than the duration of the fourth operating state ST14 in order to decrease the voltage Vcf across the flying capacitor 19*i* (when the current Ii flows in the direction is indicated in FIG. 6).

If, for example, the switched node voltage reference is less than zero, Vi*<0, the switching circuit controller 34 may only switch between the third operating state ST13 and one of the redundant second and fourth operating states TS12, TS14, so that the third, second, and fourth time periods Tst13, Tst12, Tst14 are in accordance with $$\mathrm{V}i\backslash^{*} = \frac{Tst13 \cdot \mathrm{V}z' + Tst12 \cdot 0 + Tst14 \cdot 0}{Tsw} \tag{10b}$$

and the first time period Ts11 is zero, $$Tst11 = 0. \tag{11b}$$

so that $$Tst13 = \frac{\mathrm{V}i\backslash^{*}}{\mathrm{V}z'} \cdot Tsw. \tag{12b}$$

According to one example, the switching circuit controller 34, in each drive cycle, operates the switching circuit 1*i* in the third state ST13 for the time period Tst13 and in only one of the redundant second and fourth states for the respective time period Tst12=Tsw-Tst13 and Tst14=Tsw-Tst13, wherein the switching controller 34 alternates between the second and fourth states Tst12, Tst14. Thus, for adjusting a switched node voltage reference less than zero, the order in which the switching circuit 1*i* assumes different switching states is, for example, ST13-ST12-ST13-ST14-ST13-ST12-ST13-ST14 . . . .

The voltage Vcf across the flying capacitor 19*i* can be balanced in the same way as explained hereinabove by varying the time durations in which the switching circuit 1*i* is operated in the second and fourth operating states ST12, ST14. Such a balancing of the voltage across a flying capacitor of a three-level switching circuit 1*i* of the type illustrated in FIG. 6 is basically known, so that no further detailed description is required in this regard.

According to one example, the switching controller 34 is configured to monitor the voltage Vcf across the flying capacitor and to vary the time durations in which the switching circuit 1*i* is in the second and fourth operating states ST12, ST14 in order to adjust the voltage across the flying capacitor 19*i* to be essentially equal to 50% of the overall intermediate voltage Vdc.

Referring to FIG. 8, the control circuit 3 further includes a selector 36 that is configured to select the highest switched node voltage reference Vmax* from the switched node voltage references Va*, Vb*, Vc* output by the input current controller 32. The "highest switched node voltage reference" is the switched node voltage reference having the highest magnitude, $$\text{Vmax} *= \max\{|Va\backslash *|; |Vb\backslash *|, |Vc\backslash *|\}. \tag{13}$$

Basically, in a steady state of the power converter arrangement, each of the switched node voltage references Va*\, Vb*\, Vc*\ essentially follows the respective input voltage Va, Vb, Vc. In an input voltage system that includes three alternating input voltages of the type illustrated in FIG. 2, for example, there is a highest input voltage and a corresponding highest switched node voltage reference Vmax* at each time.

Referring to FIG. 8, each of the first and second intermediate voltage reference controllers 374, 375 receives the highest switched node voltage reference Vmax* from the selector 36, wherein the first intermediate voltage reference controller 374 provides the first intermediate voltage reference Vx* based on the highest switched voltage reference Vmax* and the second intermediate voltage reference controller 375 provides the second intermediate voltage reference Vz* based on the highest intermediate voltage reference Vmax*. In the first operating mode of the power converter arrangement, the first intermediate voltage reference controller 374 outputs the highest switched node voltage reference Vmax* as the first intermediate voltage reference Vx*, and the second intermediate voltage reference controller 375 outputs the highest switched node voltage reference Vmax* as the second intermediate voltage reference Vz*. In this way, the magnitude of each of the first and second intermediate voltages Vx, Vz equals the magnitude of the highest switched node voltage reference Vmax* and one of the first and second intermediate voltages Vx, Vz equals the highest intermediate voltage reference Vmax*. If, for example, the highest intermediate voltage reference Vmax* is positive, the first intermediate voltage reference Vx* equals the highest intermediate voltage reference Vmax*. If, for example, the highest intermediate voltage reference Vmax* is negative, the second intermediate voltage reference Vz* equals the highest intermediate voltage reference Vmax*.

In this way, in the first operating mode of the power converter arrangement, the switching stage connected to the switched node that has the highest switched node voltage reference is statically operated in that operating state (switching state) that connects the switched node to the respective first or third intermediate node x, z. That is, a switching circuit 1*i* of the type illustrated in FIG. 5 or 6, for example, statically connects the switched node i\ to the first intermediate node x when the (highest) switched node voltage reference equals the first intermediate voltage reference Vx* or to the third intermediate node when the (highest) switched node voltage reference equals the third intermediate voltage reference Vz*.

It should be noted that the duration for which a certain one of the switched node voltage references Va*\, Vb*\, Vc*\ is the maximum switched node voltage reference Vmax* is much longer than the duration of one drive cycle of the respective converter stages 1*a*, 1*b*, 1*c*. Thus, the switching circuit 12*a*, 12*b*, 12*c* of the respective converter stage 1*a*, 1*b*, 1*c*, is statically operated in a certain operating states, such as the first or second operating state S1, ST2, ST11, ST12 explained above, for a duration much longer than the duration of one drive cycle. Statically operating a switching circuit 12*a*, 12*b*, 12*c* helps to avoid losses as compared to operating the switching circuit 12*a*, 12*b*, 12*c* in a switched mode.

Thus, in the first operating mode of the power converter arrangement, at each time, there is one converter stage 1*a*, 1*b*, 1*c* that is statically operated, while the other two converter stages operate in the switched-mode. Such operation of the power converter arrangement is possible, because the second power converter 2 adjusts the first and second switched node voltages Vx, Vz in accordance with the highest switched node voltage reference Vmax*.

For controlling the first intermediate voltage Vx, the control circuit 3 according to FIG. 8 includes a first intermediate voltage controller 384 that receives the first intermediate voltage reference Vx* and generates a first duty cycle d4 for operating the first converter stage 4. A first drive circuit 394 receives the first duty cycle d4 and generates the control signal S4 for operating the first converter stage 4 based on the duty cycle d4. In particular, the control signal S4 controls operation of the electronic switch 47 in the first converter stage 4 in accordance with the duty cycle d4 provided by the first intermediate voltage controller 384.

For controlling the second switched node voltage Vz, the control circuit 3 according to FIG. 8 includes a second intermediate voltage controller 385 that receives the second intermediate voltage reference Vz* and generates a second duty cycle d5 for operating the second converter stage 5. A second drive circuit 395 receives the second duty cycle d5 and generates the control signal S5 for operating the second converter stage 5 based on the duty cycle d5. In particular, the control signal S5 controls operation of the electronic switch 57 in the second converter stage 5 in accordance with the duty cycle d5 provided by the second intermediate voltage controller 385.

More detailed examples of some of the control units included in the control circuit 3 according to FIG. 8 are illustrated and explained in the following.

Figure 9:
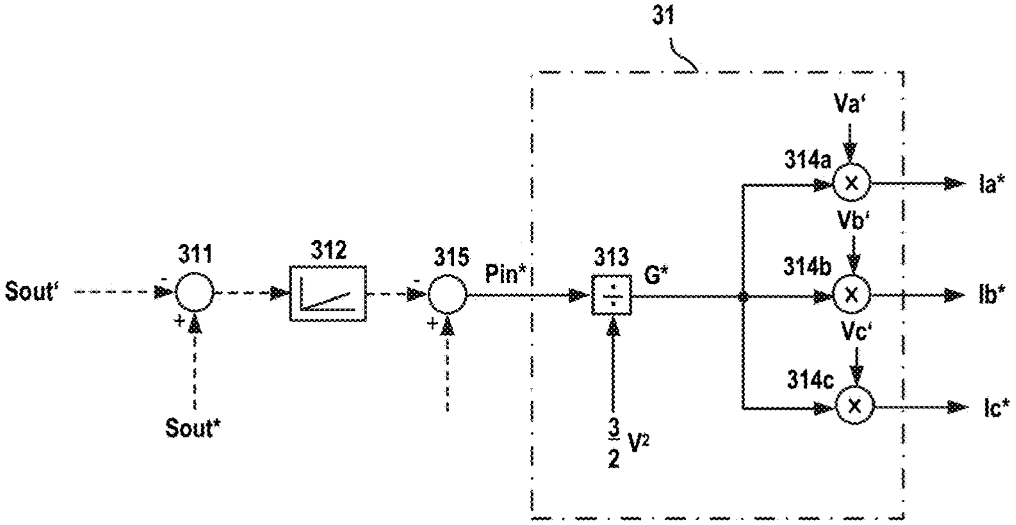
FIG. 9 illustrates one example of an output signal controller included in the control circuit according to FIG. 8.

FIG. 9 illustrates one example of the output signal controller 31 that receives the input power reference Pin*. Referring to FIG. 9, the output signal controller 31 generates a conductance reference G*, which represents a desired input conductance of the first power converter 1. Each of the input current references Ia*, Ib*, Ic* is generated by multiplying the conductance reference G* by a respective measured input voltage Va', Vb', Vc' using a respective multiplier 314*a*, 314*b*, 314*c*. In this way, each of the input current references Ia*, Ib*, Ic* is proportional to the respective input voltage Va, Vb, Vc so that a PFC functionality is achieved. Each of the measured input voltages Va', Vb', Vc' represents the respective input voltage Va, Vb, Vc and can be obtained by measuring the input voltage Va, Vb, Vc using a conventional voltage measurement circuit.

Referring to FIG. 9, generating the conductance reference G* may include dividing the input power reference Pin* by $$\frac{3}{2}V^2$$

$V^2$ using a divider 313, where V denotes the amplitude of the input voltages Va, Vb, Vc. The amplitude is given by $\sqrt{2}$ times the RMS value explained above.

The input power reference Pin* may be obtained in various ways. According to one example, the input power reference is fixed. In this example, a load Z implemented as a battery may be charged with a constant power.

According to another example, illustrated in dashed lines in FIG. 9, the input power reference Pin* is generated based on an output signal reference Sout* and a measured output signal Sout'. In this example, the input power reference Pin* is variable and is adjusted such that the output signal is regulated to be in accordance with the output signal reference Sout*. The output signal is the output voltage Vout, for example. In this example, the output signal reference Sout* represents a desired voltage level of the output voltage Vout, and the measured output signal Sout' represents the measured output voltage Vout. According to another example, the output signal is the output current Iout. In this example, the output signal reference Sout* represents a desired current level of the output current Iout, and the measured output signal Sout' represents the measured output current.

Referring to FIG. 9, obtaining the input power reference Pin* may include subtracting, by a subtractor 311, the measured output signal Sout' from an output signal reference Sout*. An output signal of the subtractor 311 is an error signal that represents a difference between the signal level of the desired output signal Sout* and the signal level of the existing (measured) output signal Sout'. A controller 312 such as, for example, a PT (proportional-integral) controller receives the error signal and outputs the input power reference Pin*. Optionally, the instantaneous output power is measured to obtain a measured output power Pout' and the measured output power Pout' is added to the controller output signal by an adder 315 to obtain the input power reference Pin*. The measured output power Pout' is a feedforward signal in this example.

The input power reference Pin* represents a desired (average) input power. The average input power is the input power over at least one drive cycle of the switched mode operation of the first power converter 1. In the example explained herein before, in which the input voltages are sinusoidal input voltages and, due to the PFC functionality of the first power converter 1, the input currents Ia, Ib, Ic are sinusoidal input currents, the input power at each of the three inputs a, b, c has a sine squared waveform. Due to the phase shift (120°) between the input voltages Va, Vb, Vc and a corresponding phase shift between the input currents Ia, Ib, Ic the overall input power Pin is essentially constant. Consequently, the input power reference Pin* is essentially constant.

Figure 10:
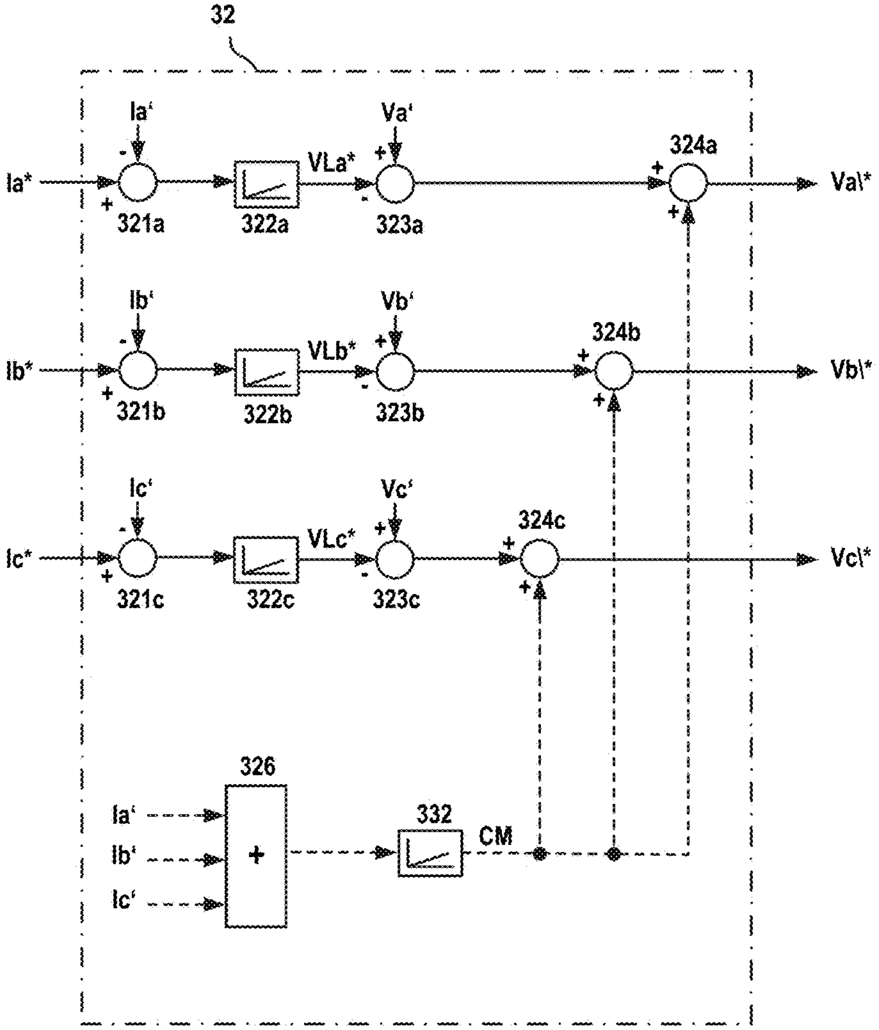
FIG. 10 illustrates one example of an input current controller included in the control circuit according to FIG. 8.

FIG. 10 illustrates one example of the input current controller 32. The input current controller 32 according to FIG. 10 includes a first, a second, and a third controller branch, wherein each of these controller branches is configured to provide one of the three switched node voltage references Va*, Vb*, Vc*. In the following, the first controller branch that is configured to generate the switched node voltage Va* based on the input current reference Ia* and the ground control signal Scm* is briefly explained in the following. The other two controller branches are implemented and operated in the same way. In the three controller branches, corresponding parts are labeled with corresponding reference signs. "Corresponding reference signs" are reference signs that have the same number and that are different by added character "a" in the first controller branch, "b" in the second controller branch, and "c" in the third controller branch.

Referring to FIG. 10, the first controller branch includes an adder 321*a* that subtracts a measured input current Ia' from the input current reference Ia* to obtain an input current error. The measured input current Ia' represents the (average) input current Ia and may be obtained by measuring the input current Ia using a conventional current measurement circuit and low pass filtering the measured values in order to obtain the average of the input current Ia over at least one drive cycle. A controller 322*a*, such as a PI controller, generates an inductor voltage reference VLa* based on the input current error. The inductor voltage reference VLa* represents the desired average voltage across the inductor 11*a* in the first converter stage 1*a*. The inductor voltage reference VLa* represents the inductor voltage that is required to achieve that the first input current Ia at least approximately equals the first input current reference Ia*. The switched node voltage Va* reference is given by the measured first input voltage Va' minus the inductor voltage reference VLa*.

Optionally, each of the switched node voltage references Va*, Vb*, Vc* is offset by a common mode signal CM. That is, in this example, the common mode signal CM is added to the output signals of the subtractors 323*a*, 323*b*, 323*c* using adders 324*a*, 324*b*, 324*c* to obtain the switched node voltage references Va*, Vb*, Vc*. Taking into account the common mode signal CM improves the stability of regulating the intermediate voltages Vx, Vz, in particular during transients.

According to one example, the common mode signal CM is obtained by adding the measured input currents Ia', Ib', Ic' using an adder 326 and filtering the resulting signal using a PI filter (controller), for example. As can be seen from FIG. 10, the common mode signal CM affects each of the input voltage references Va*, Vb*, Vc* in the same way. That is, each of the input voltage references Va*, Vb*, Vc* changes in the same way when the common mode signal changes.

Figure 11:
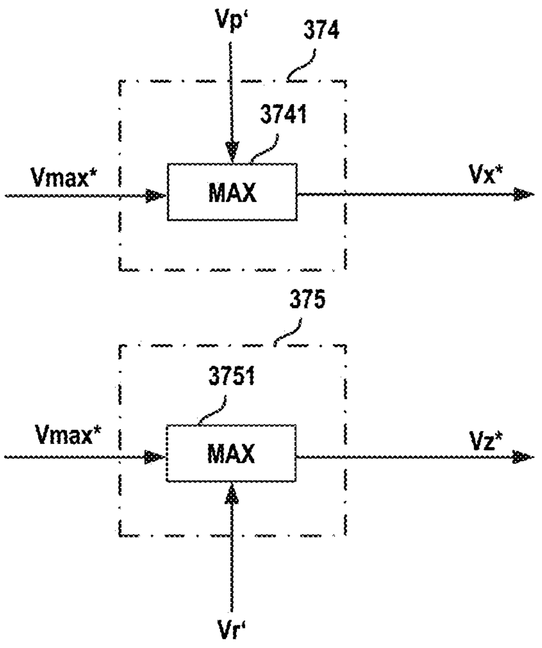
FIG. 11 illustrates examples of first and second intermediate voltage reference controllers included in the control circuit according to FIG. 8.

FIG. 11 illustrates examples of the first and second intermediate voltage reference controllers 374, 375. In this example, each of the first and second intermediate voltage reference controllers 374, 375 includes a maximum selector 3741, 3751 that is configured to receive two signals, detect which one of the two signals has the higher magnitude, and output the signal having the higher magnitude.

Referring to FIG. 11, the maximum selector 3714 included in the first intermediate voltage reference controller 374 receives the maximum switched node voltage reference Vmax* and the measured first output voltage portion Vp'. According to one example, both the maximum switched node voltage reference Vmax* and the measured first output voltage portion Vp' are positive, so that the maximum selector 3714 outputs the more positive one of these two signals (values).

Referring to FIG. 11, the maximum selector 3751 included in the second intermediate voltage reference controller 375 receives the maximum switched node voltage reference Vmax* and the measured second output voltage portion Vr'. According to one example, both the minimum switched node voltage reference Vmin* and the measured second output voltage portion Vr' are negative, so that the maximum selector 3751 outputs the more negative one of these two signals (values).

Referring to the above, in the first operating mode of the power converter arrangement, one of the first and a second intermediate voltage references Vx*, Vz* equals the maximum switched node voltage reference Vmax*. Thus, considering the functionality of the first and second intermediate voltage reference controllers 374, 375, the power converter arrangement operates in the first operating mode when the magnitude of the maximum switched node voltage reference Vmax* is higher than the magnitudes of both the first output voltage portion Vp' and the second output voltage portion Vr'.

Figure 12:
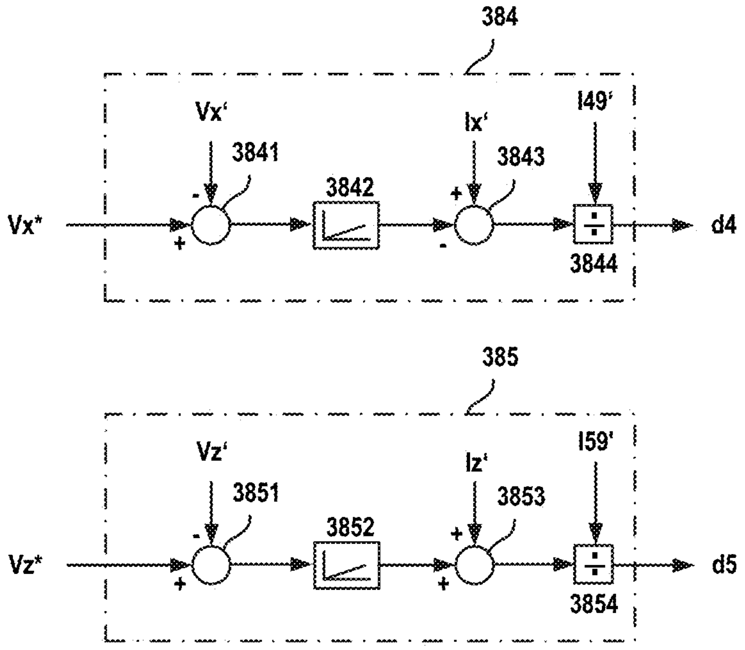
FIG. 12 illustrates examples of the first and second intermediate voltage controllers included in the control circuit according to FIG. 8.

FIG. 12 illustrates examples of the first and second intermediate voltage controllers 384, 385. As explained above, the first intermediate voltage controller 384 receives the first intermediate voltage reference Vx* and generates the duty cycle d4 for operating the electronic switch 47 in the first converter stage 4 of the second power converter 2. The second intermediate voltage controller 385 receives the second intermediate voltage reference Vz* and generates the duty cycle d5 for operating the electronic switch 57 in the second converter stage 5 of the second power converter 2. The first and second intermediate voltage controllers 384, 385 are implemented in the same way. In the following, the first intermediate voltage controllers 384 and its functionality is explained in detail. This explanation applies to the second intermediate voltage controller 385 accordingly, wherein the corresponding reference signs of parts and signals in the second intermediate voltage controller 385 are indicated in brackets in the explanation herein below.

Referring to FIG. 12, the first intermediate voltage controllers 384 includes a subtractor 3841 that subtracts the first intermediate voltage reference Vx* from the measured first intermediate voltage Vx'. The measured first intermediate voltage Vx' represents the first intermediate voltage Vx and may be obtained by measuring the first intermediate voltage Vx using a conventional mode voltage measurement circuit. An output signal of the subtractor 3841, which represents a difference between the first intermediate voltage reference Vx* and the measured first intermediate voltage Vx', is received by a controller 3842, which is a PI controller, for example. A further subtractor 3843 subtracts an output signal of the controller 3841 from the first (average) intermediate current Ix'. The first (average) intermediate current Ix' may be measured using a current sensor, may be calculated based on the measured input currents Ia', Ib', Ic, or may be calculated based on The duration of the individual switching stages of the switching circuits 12*a*, 12*b*, 12*c* in the three converter stages 1*a*, 1*b*, 1*c*. The first (average) intermediate current Ix' is a feedforward signal in the control loop illustrated in FIG. 12. The average of the intermediate current Ix is the average over one or more drive cycles of the switched-mode operation of the first power converter 1.

Referring to FIG. 12, a divider 3844 divides an output signal of the subtractor 3843 by the measured first inductor current I49', which represents the current through the inductor 49.

The first intermediate voltage controller 384 illustrated in FIG. 12 is configured to control operation of the first converter stage 4 taking into account the first intermediate voltage reference Vx*, the measured first intermediate voltage Vx', and the measured first intermediate current Ix' such that the first intermediate voltage Vx at least approximately equals the first intermediate voltage reference Vx*, so that the first intermediate voltage Vx tracks the first intermediate voltage reference Vx*. Equivalently, the second intermediate voltage controller 385 illustrated in FIG. 12 is configured to control operation of the second converter stage 5 taking into account the second intermediate voltage reference Vz*, the measured second intermediate voltage Vz', and the measured second intermediate current Iz' such that the second intermediate voltage Vz at least approximately equals the second intermediate voltage reference Vz*, so that the second intermediate voltage Vz tracks the second intermediate voltage reference Vz*.

Instead of subtractor 3843 in the first intermediate voltage controller, the second intermediate voltage controller 385 includes an adder 3853 that adds an output signal of controller 3852 to the second (average) intermediate current Iz'. A divider 3854 divides an output signal of the adder 3853 by the measured second inductor current I49'.

Referring to FIG. 11, in the event that the measured first output voltage portion Vp' is higher than the maximum switched node voltage reference Vmax*, the first intermediate voltage reference Vx* equals the measured first output voltage portion Vp'. In this case, the first intermediate voltage controller 384 controls the first intermediate voltage Vx to be essentially equal to the first output voltage portion Vp', which includes that the duty cycle d4 is generated by the first intermediate voltage controller 384 to be equal to 1, d4=1, so that the switch 47 is permanently switched on and the first converter stage 4 can be considered to be deactivated.

Equivalently, in the event that the magnitude of the measured second output voltage Vr' is higher than the magnitude of the maximum switched node voltage reference Vmax*, the second intermediate voltage Vz* equals the measured second output voltage portion Vr'. In this case, the second intermediate voltage controller 385 controls the second intermediate voltage Vz to be essentially equal to the second output voltage portion Vr, which includes that the duty cycle d5 is generated by the second intermediate voltage controller 385 to be equal to 1, dr=1, so that the switch 57 is permanently switched on and the second converter stage 5 can be considered to be deactivated.

Figure 13:
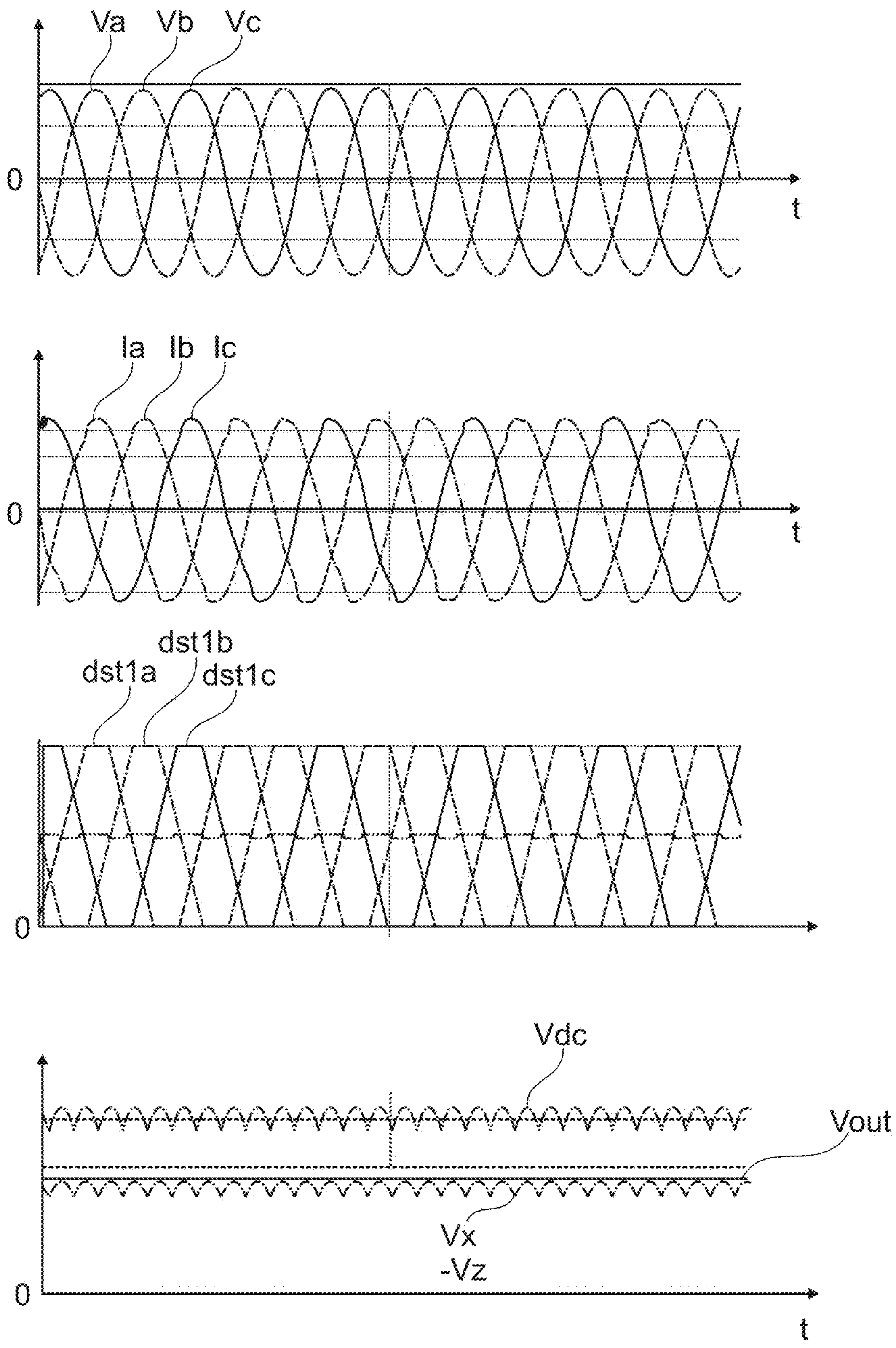
FIG. 13 shows signal diagrams that illustrate operating the power converter arrangement in a first operating mode.
Figure 14:
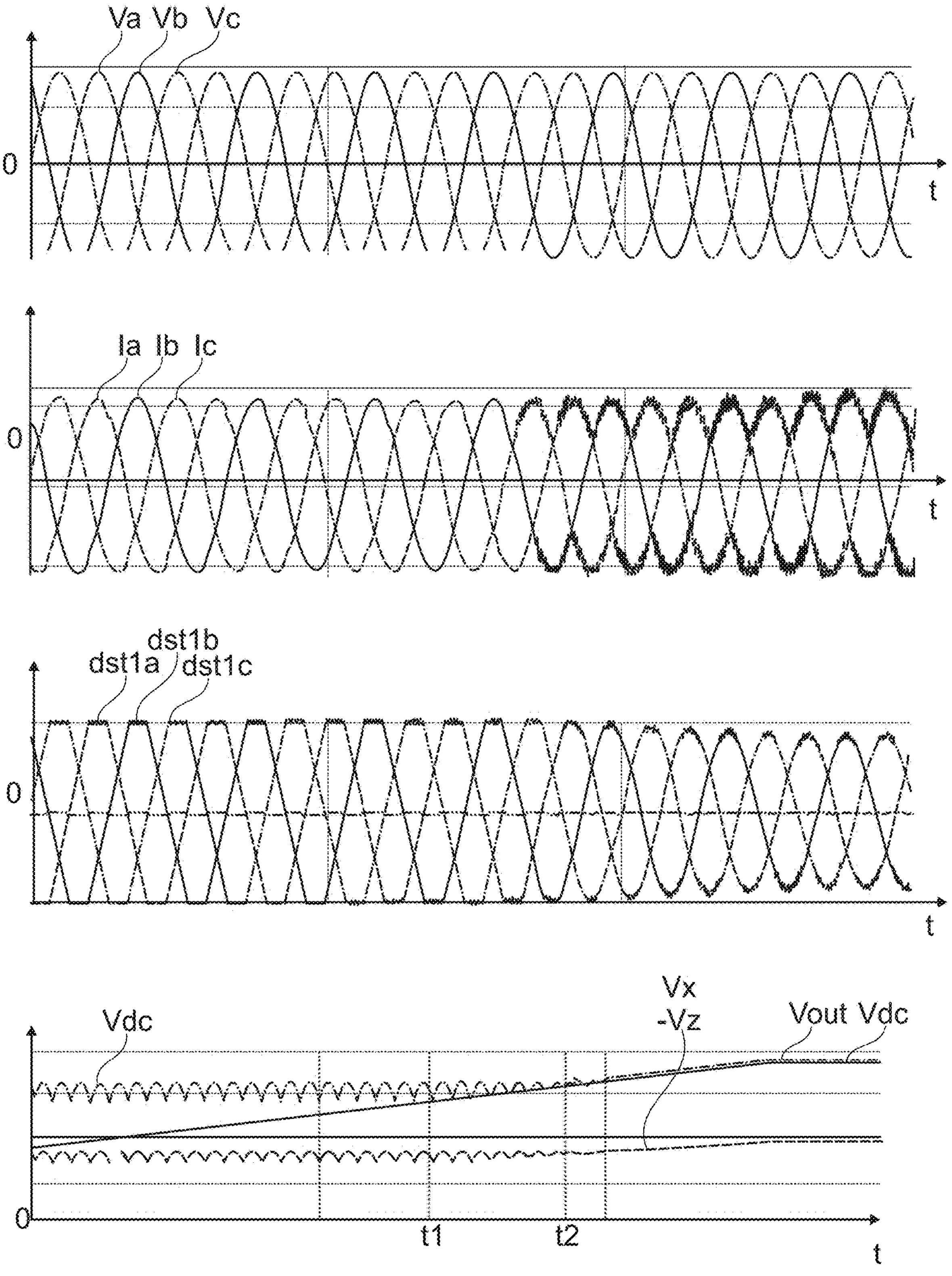
FIG. 14 shows signal diagrams that illustrate operating the power converter arrangement in a first operating mode, a second operating mode and a transition phase between the first and second operating modes.

FIG. 13 shows signal diagrams that illustrate operating the power converter arrangement in the first operating mode. More specifically, FIG. 13 shows signal diagrams of the input voltages Va, Vb, Vc; the input currents Ia, Ib, Ic, the output voltage Vout, the first intermediate voltage Vx, the negated second intermediate voltage Vz, and the overall DC link voltage Vdc. Furthermore, FIG. 14 illustrates the first duty cycles dst1*a*, dst1*b*, dst1*c* of switching stages 12*a*, 12*b*, 12*c* of the type illustrated in FIG. 5 of the individual converter stages 1*a*, 1*b*, 1*c*. As can be seen from FIG. 13, each of the input currents Ia, Ib, Ic has the same waveform as the corresponding input voltage Va, Vb, Vc. Thus, the power converter arrangement has a PFC functionality. FIG. 13 illustrates the instantaneous input currents Ia, Ib, Ic which include high frequent variations due to the switched mode operation of the first power converter 1.

Referring to the above, in the first operating mode of the power converter arrangement, the first and second intermediate voltages Vx, Vz are regulated by the second power converter 2 such that the first and second intermediate voltages Vx, Vz have the same magnitude. In the example explained herein before, in which the first and second intermediate voltages Vx, Vz have opposite polarities, the second intermediate voltage Vx, as illustrated in FIG. 14, equals the negated second intermediate voltage Vz.

As explained above, each of the switched node voltage references Va*, Vb*, Vc* is similar to the respective input voltage Va, Vb, Vc. Thus, the magnitude of the first and second intermediate voltages essentially track the magnitude of the highest input voltage, which is the input voltage having the highest magnitude. In the first operating mode, the first and second intermediate voltages Vx, Vz have a voltage ripple with a frequency that is essentially six times the frequency of the alternating input voltages Va, Vb, Vc.

Referring to the above, in those time periods in which the switched node voltage Vi\ of an arbitrary one 1*i* of the converter stages 1*a*, 1*b*, 1*c* equals one of the first and second intermediate voltages Vx, Vz the converter stage 1*i* can be statically operated by either connecting the switched node i\ to the first intermediate node x are the second intermediate node z. Referring to the above, in a switching circuit of the type illustrated in FIG. 5, permanently connecting the switched node i\ to the first intermediate node x is equivalent to operating the switching circuit 12*i* with a first duty cycle dst1=1 and a second duty cycle dst2=0, and permanently connecting the switched node i\ to the second intermediate node z is equivalent to operating the switching circuit 12*i* with a first duty cycle dst1=0 and a second duty cycle dst2=1. in FIG. 14, dst1*a* denotes the duty cycle of the switching circuit in the first converter stage 1*a*, dst1*b* denotes the duty cycle of the switching circuit in the second converter stage 1*b*, and dst1*c* denotes the duty cycle of the switching circuit in the third converter stage 1*c*.

In those time periods in which the first input voltage Va is the highest input voltage, for example, so that the switched node voltage reference Va* of the first converter stage 1*a* is the highest switched node voltage reference Vmax*, the first converter stage 1*a* is statically operated either in the first operating mode ST1 to connect the switched node a\ to the first intermediate node x or the second operating mode ST2 to connect the switched node a\ to the second intermediate node z. This can be seen from FIG. 14 in that the first duty cycle dst1*a* of the first converter stage 1*a* is either 1 or 0 when the first input voltage Va is the highest input voltage (and the first input voltage reference Va* is the highest input voltage reference). The first duty cycle dst1*a* of the first converter stage 1*a* is 1, so that the switched node a is connected to the first intermediate node x, when the input voltage Va is positive and the highest input voltage. The first duty cycle dst2*a* of the first converter stage 1*a* is 0, so that the switched node a\ is connected to the second intermediate node z, when the input voltage Va is negative and the highest input voltage.

As can be seen from FIG. 15, in the first operating mode, the first output voltage Vout is lower than the overall intermediate voltage Vdc. Thus, the magnitude of each of the first and second output voltage portions Vp, Vr is lower than the magnitude of each of the first and second intermediate voltage is Vx, Vz. The magnitude of the first and second output voltage portions Vp, Vr is essentially 50% of the magnitude of the output voltage Vout According to one example, the power converter arrangement is also capable of operating in a second operating mode. The power converter arrangement operates in the second operating mode when the magnitude of the first output voltage portion Vp is higher than the highest switched node voltage reference Vmax* and the magnitude of the second output voltage portion Vr is higher than the highest switched node voltage reference Vmax*. In this case, referring to FIG. 11, the first intermediate voltage controller outputs the measured first output voltage portion Vp' as the first intermediate voltage reference Vx* and the second intermediate voltage controller 375 output the measured second output voltage portion Vr' as the second intermediate voltage reference Vz*. In this operating mode, each of the three converter stages 1*a*, 1*b*, 1*c* operates in the switched mode, so that an operating mode of the first power converter 1 may be referred to as 3/3 mode. In this operating mode, as explained above, the switches 47, 57 in each of the first and second converter stages 4, 5 are switched on permanently. In this operating mode, the output voltage Vout and the overall DC link voltage Vdc is only regulated by operating the first power converter 1.

FIG. 14 shows signal diagrams that illustrate operating the power converter arrangement in the second operating mode. More specifically, FIG. 14 shows signal diagrams of the input voltages Va, Vb, Vc, the input currents Ia, Ib, Ic, the output voltage Vout, the first intermediate voltage Vx, the negated second intermediate voltage Vz, and the first duty cycles dst1*a*, dst1*b*, dst1*c*. FIG. 14 illustrates FIG. 14 illustrates operating the power converter arrangement in three different time periods, a first time period, which is a time period before a first time instance t1, a second time period, which is a time period between the first time instance t1 and a second time instance t2, and a third time period, which is a time period after the second time instance.

Basically, the power converter arrangement operates in the second operating mode, when the output voltage Vout is higher than twice the magnitude of the highest input voltage. Furthermore, the power converter arrangement operates in the first operating mode when the output voltage Vout is lower than twice the highest input voltage. As explained herein before, the voltage level of the highest input voltage may vary over time. Thus, during one period of the input voltages Va, Vb, Vc, there may be time periods in which the output voltage Vout is higher than twice the magnitude of the respective highest input voltage and time periods in which the output voltage Vis lower than twice the magnitude of the respective highest input voltage.

Thus, the power converter arrangement operates in the first operating mode throughout successive periods of the input voltages Va, Vb, Vc when the output voltage Vout is lower than twice the highest his switched node voltage reference Vmax*, which essentially equals twice the magnitude of the highest input voltage, throughout the periods of the input voltages Va, Vb, Vc. In this operating mode, which is illustrated before the first time instance t1 in FIG. 14, the overall DC link voltage is always higher than the output voltage Vout, so that the first and second converter stages 4, 5 of the second power converter 2 operate as buck converters and adjust the first and second intermediate voltages Vx, Vz.

The power converter arrangement operates in the second operating mode throughout successive periods of the input voltages Va, Vb, Vc when the output voltage Vout is higher than twice the highest note voltage reference Vmax*, which essentially equals the magnitude of the highest input voltage, throughout the periods of the input voltages Va, Vb, Vc. In this operating mode, which is illustrated after the second time instance t2 in FIG. 14, the overall DC link voltage equals the output voltage and the first and second converter stages 4, 5 of the second power converter 2 are deactivated.

When the output voltage Vout increases from the voltage level in which the power converter arrangement operates in the first operating mode throughout the periods of the input voltages Va, Vb, Vc towards the voltage level in which the power converter arrangement operates in the second operating mode throughout the periods of the input voltages Va, Vb, Vc there may be a transition phase. Operating the power converter arrangement in this transition phase is illustrated in the second time period between the first and second time instances t1, t2 in FIG. 14.

In the transition phase, there are time periods in which the output voltage Vout is lower than twice the magnitude of the highest switched node voltage reference Vmax*, so that the first and second intermediate voltages Vx, Vz are regulated by the second power converter 2 to have a magnitude that is essentially equal to the magnitude of the maximum switched node voltage reference Vmax*. In the transition phase, there are also time periods in which the output voltage Vout is higher than twice the magnitude of the highest switched node voltage reference Vmax*, so that the second power converter 2 is deactivated and the first and second intermediate voltages Vx, Vz are in accordance with the first and second output voltage portions Vp, Vr. In the transition phase, there time periods in which a respective one of the converter stages 1*a*, 1*b*, 1*c* is statically operated in one of the first and second operating states explained above. These time periods, however, are shorter than the corresponding time periods when the power converter arrangement is operated in the first operating mode throughout successive periods of the input voltages Va, Vb, Vc.

Some of the aspects explained above are briefly summarized in the following with reference to numbered examples.

Example 1. A method, including: operating a power converter arrangement in a first operating mode, wherein the power converter arrangement includes: input nodes, each configured to receive a respective one of input voltages, intermediate nodes, and output nodes; a first power converter coupled between the input nodes and the intermediate nodes; and a second power converter coupled between the intermediate nodes and the output nodes, and wherein operating the power converter arrangement in the first operating mode includes: adjusting an input power received by the first power converter; and adjusting each of a first intermediate voltage and a second intermediate voltage by the second power converter, wherein adjusting the input power received by the first power converter includes determining switched node voltage references of the first power converter, and wherein adjusting the first intermediate voltage and the second intermediate voltage includes: selecting a highest switched node voltage reference from the switched node voltage references; and adjusting each of the first and second intermediate voltages to have a magnitude that is at least approximately equal to the magnitude of the highest switched node voltage reference.

Example 2. The method of example 1, wherein selecting the highest switched node a voltage reference includes: determining magnitudes of the switched node voltage references; and selecting that switched node voltage reference with the highest magnitude as the highest switched node voltage reference.

Example 3. The method of example 1 or 2, wherein the first intermediate voltage is a voltage between a first intermediate node and a second intermediate node of the intermediate nodes, and wherein the second intermediate voltage is a voltage between a third intermediate node and the second intermediate node of the intermediate nodes.

Example 4. The method of example 3, wherein the first power converter is coupled between the input nodes and the first and third intermediate nodes.

Example 5. The method of example 4, wherein the first power converter includes converter stages each coupled between a respective one of the input nodes and the first and third intermediate nodes.

Example 6. The method of example 5, wherein each of the converter stages includes: an inductor coupled to the respective one of the input nodes; and a switching circuit coupled between the inductor and the first and third intermediate nodes.

Example 7. The method of example 6, wherein the switching circuit includes: at least one switch connected between the inductor and the first intermediate node; and at least one switch connected between the inductor and the second intermediate node.

Example 8. The method of example 7, wherein the at least one switch connected between the inductor and the first intermediate node includes a first switch and a second switch connected in series between the inductor and the first intermediate node, wherein the at least one switch connected between the inductor and the second intermediate node includes a third switch and a fourth switch connected in series between the inductor and the second intermediate node, and wherein the switching circuit further includes a capacitor connected between a circuit node at which the first switch and the second switch are connected and a circuit node at which the third switch and the fourth switch are connected.

Example 9. The method of any one of examples 1 to 8, wherein the second power converter is devoid of a transformer between the intermediate nodes and the output nodes.

Example 10. The method of any one of examples 1 to 9, wherein the second power converter includes a first converter stage and a second converter stage, wherein adjusting the first intermediate voltage includes adjusting the first intermediate voltage by the first converter stage, and wherein adjusting the second intermediate voltage includes adjusting the second intermediate voltage by the second converter stage.

Example 11. The method of example 10, wherein each of the first and second converter stages includes a buck converter.

Example 12. The method of any one of examples 1 to 11, wherein the further includes operating the power converter arrangement in a second operating mode, wherein operating the power converter arrangement in the second operating mode includes deactivating the second power converter.

Example 13. The method of example 12, wherein the method further includes adjusting an output voltage between the output nodes by a load connected to the output nodes, wherein the output voltage includes a first output voltage portion and a second output voltage portion, and wherein operating the power converter arrangement in the second operating mode includes operating the power converter arrangement in the second operating mode when each of the first and second output voltage portions is lower than the magnitude of the highest intermediate voltage reference.

Example 14. A controller configured to operate a power converter arrangement in a first operating mode, wherein the power converter arrangement includes: input nodes, each configured to receive a respective one of input voltages, intermediate nodes, and output nodes; a first power converter coupled between the input nodes and the intermediate nodes; a second power converter coupled between the intermediate nodes and the output nodes, and wherein to operate the power converter arrangement in the first operating mode includes: to adjust an input power received by the first power converter, and to adjust each of a first intermediate voltage and a second intermediate voltage by the second power converter, wherein to adjust the input power received by the first power converter includes determining switched node voltage references of the first power converter, and wherein to adjust the first intermediate voltage and the second intermediate voltage includes: to select a highest switched node voltage reference from the switched node voltage references, and to adjust each of the first and second intermediate voltages to have a magnitude that is at least approximately equal to the magnitude of the highest switched node voltage reference.

Example 15. A power converter arrangement, including: input nodes, each configured to receive a respective one of input voltages, intermediate nodes, and output nodes; a first power converter coupled between the input nodes and the intermediate nodes; a second power converter coupled between the intermediate nodes and the output nodes; and a controller according to example 13.

Example 16. An executable program code including instructions which, when executed by a control circuit including a microcontroller, to cause the control circuit to carry out the method of any one of examples 1 to 13.

The invention claimed is:

1. A method comprising:

operating a power converter in a first operating mode, wherein the power converter comprises: input nodes (a, b, c), each configured to receive a respective one of input voltages (Va, Vb, Vc), intermediate nodes (x, y, z), and output nodes (p, r); a first power converter (1) coupled between the input nodes (a, b, c) and the intermediate nodes (x, y, z); and a second power converter coupled between the intermediate nodes (x, y, z) and the output nodes (p, r), and wherein operating the power converter in the first operating mode comprises:

adjusting an input power received by the first power converter (1), wherein adjusting the input power received by the first power converter (1) comprises:

i) determining switched node voltage references (Va*, Vb*, Vc*) of the first power converter (1);

ii) selecting a highest switched node voltage reference (Vmax*) from the switched node voltage references (Va*, Vb*, Vc*); and iii) via the second power converter, adjusting each of a first intermediate voltage (Vx) and a second intermediate voltage (Vy) to have a magnitude that is at least approximately equal to a magnitude of the highest switched node voltage reference (Vmax*).

2. The method of claim 1, wherein selecting the highest switched node voltage reference (Vmax*) comprises:

determining magnitudes of the switched node voltage references (Va*, Vb*, Vc*); and selecting that switched node voltage reference with the highest magnitude to be the highest switched node voltage reference (Vmax*).

3. The method of claim 1, wherein the first intermediate voltage (Vx) is a voltage between a first intermediate node (x) and a second intermediate node (y) of the intermediate nodes (x, y, z), and wherein the second intermediate voltage (Vy) is a voltage between a third intermediate node (z) and the second intermediate node (y) of the intermediate nodes (x, y, z).

4. The method of claim 3, wherein the first power converter (1) is coupled between the input nodes (a, b, c) and the first and third intermediate nodes (x, z).

5. The method of claim 4, wherein the first power converter (1) comprises converter stages (1*a*, 1*b*, 1*c*) each coupled between a respective one of the input nodes (a, b, c) and the first and third intermediate nodes (x, z).

6. The method of claim 5, wherein each of the converter stages (1*a*, 1*b*, 1*c*) comprises:

an inductor (11*a*, 11*b*, 11*c*) coupled to the respective one of the input nodes (a, b, c); and a switching circuit (12*b*, 12*b*, 12*c*) coupled between the inductor (11*a*, 11*b*, 11*c*) and the first and third intermediate nodes (x, z).

7. The method of claim 6, wherein the switching circuit (12*a*, 12*b*, 12*c*) comprises:

at least one switch (17*i*; 171*i*, 172*i*) connected between the inductor (11*a*, 11*b*, 11*c*) and the first intermediate node (x); and at least one switch (18*i*; 181*i*, 182*i*) connected between the inductor (11*a*, 11*b*, 11*c*) and the second intermediate node (z).

8. The method of claim 7, wherein the at least one switch connected between the inductor (11*a*, 11*b*, 11*c*) and the first intermediate node (x) comprises a first switch (171*i*) and a second switch (172*i*) connected in series between the inductor (11*a*, 11*b*, 11*c*) and the first intermediate node (x), wherein the at least one switch connected between the inductor (11*a*, 11*b*, 11*c*) and the second intermediate node (y) comprises a third switch (181*i*) and a fourth switch (182*i*) connected in series between the inductor (11*a*, 11*b*, 11*c*) and the second intermediate node (x), and wherein the switching circuit (12*a*, 12*b*, 12*c*) further comprises a capacitor (19*i*) connected between a circuit node at which the first switch (171*i*) and the second switch (172*i*) are connected and a circuit node at which the third switch (181*i*) and the fourth switch (182*i*) are connected.

9. The method of claim 1, wherein the second power converter (2) is devoid of a transformer between the intermediate nodes (x, y, z) and the output nodes (p, r).

10. The method of claim 1, wherein the second power converter (2) comprises a first converter stage (5) and a second converter stage (6), wherein adjusting the first intermediate voltage (Vx) comprises adjusting the first intermediate voltage (Vx) by the first converter stage (5), and wherein adjusting the second intermediate voltage (Vy) comprises adjusting the second intermediate voltage (Vy) by the second converter stage (6).

11. The method of claim 10, wherein each of the first and second converter stages (5, 6) comprises a buck converter.

12. The method of claim 1, wherein the further comprises operating the power converter in a second operating mode, wherein operating the power converter in the second operating mode comprises deactivating the second power converter (6).

13. The method of claim 12, wherein the method further comprises adjusting an output voltage (Vout) between the output nodes (p, r) by a load connected to the output nodes (p, r), wherein the output voltage (Vout) comprises a first output voltage portion (Vp) and a second output voltage portion (Vr), and wherein operating the power converter in the second operating mode comprises operating the power converter in the second operating mode when each of the first and second output voltage portions (Vp, Vr) is lower than the magnitude of the highest intermediate voltage reference (Vmax*).

14. A controller configured to operate a power converter in a first operating mode, wherein the power converter comprises:

input nodes (a, b, c), each configured to receive a respective one of input voltages (Va, Vb, Vc), intermediate nodes (x, y, z), and output nodes (p, r);

a first power converter (1) coupled between the input nodes (a, b, c) and the intermediate nodes (x, y, z);

a second power converter coupled between the intermediate nodes (x, y, z) and the output nodes (p, r), and wherein to operate the power converter in the first operating mode comprises:

to adjust an input power received by the first power converter (1), and to adjust each of a first intermediate voltage (Vx) and a second intermediate voltage (Vy) by the second power converter (2), wherein to adjust the input power received by the first power converter (1) comprises determining switched node voltage references (Va*, Vb*, Vc*) of the first power converter (1), and wherein to adjust the first intermediate voltage (Vx) and the second intermediate voltage (Vy) comprises:

to select a highest switched node voltage reference (Vmax*) from the switched node voltage references (Va*, Vb*, Vc*), and to adjust, via the second power converter, each of the first and second intermediate voltages (Vx, Vy) to have a magnitude that is at least approximately equal to the magnitude of the highest switched node voltage reference (Vmax*).

15. A power converter comprising:

input nodes (a, b, c), each configured to receive a respective one of input voltages (Va, Vb, Vc), intermediate nodes (x, y, z), and output nodes (p, r);

a first power converter (1) coupled between the input nodes (a, b, c) and the intermediate nodes (x, y, z);

a second power converter coupled between the intermediate nodes (x, y, z) and the output nodes (p, r); and a controller according to claim 13.

16. An executable program code comprising instructions which, when executed by a control circuit comprising a microcontroller, to cause the control circuit to carry out the method of claim 1.

* * * * *